United States Patent
Li et al.

(10) Patent No.: US 10,672,334 B2
(45) Date of Patent: Jun. 2, 2020

(54) ORGANIC LIGHT-EMITTING DISPLAY PANEL, METHOD FOR DRIVING THE SAME, AND ORGANIC LIGHT-EMITTING DISPLAY DEVICE

(71) Applicant: Shanghai Tianma AM-OLED Co., Ltd., Shanghai (CN)

(72) Inventors: Yue Li, Shanghai (CN); Renyuan Zhu, Shanghai (CN); Dongxu Xiang, Shanghai (CN); Yana Gao, Shanghai (CN); Xingyao Zhou, Shanghai (CN)

(73) Assignee: SHANGHAI TIANMA AM-OLED CO. LTD., Shanghai (CN)

( * ) Notice: Subject to any disclaimer, the term of this patent is extended or adjusted under 35 U.S.C. 154(b) by 0 days.

(21) Appl. No.: 16/181,520

(22) Filed: Nov. 6, 2018

(65) Prior Publication Data

US 2020/0005706 A1    Jan. 2, 2020

(30) Foreign Application Priority Data

Jun. 29, 2018 (CN) .......................... 2018 1 0697105

(51) Int. Cl.
  *G09G 3/3225* (2016.01)
  *G06K 9/00* (2006.01)
  *G09G 3/3266* (2016.01)

(52) U.S. Cl.
  CPC ......... *G09G 3/3225* (2013.01); *G06K 9/0004* (2013.01); *G09G 3/3266* (2013.01); *G09G 2310/0286* (2013.01); *G09G 2320/0233* (2013.01); *G09G 2320/0686* (2013.01)

(58) Field of Classification Search
  CPC ... G09G 3/3225; G09G 3/3266; G06K 9/0004
  USPC ............................. 345/690; 714/26; 382/124
  See application file for complete search history.

(56) References Cited

U.S. PATENT DOCUMENTS

| | | | |
|---|---|---|---|
| 2004/0252867 A1* | 12/2004 | Lan ...................... | G06K 9/0004 382/124 |
| 2007/0079192 A1* | 4/2007 | Kim ..................... | G09G 3/3208 714/726 |
| 2016/0284272 A1* | 9/2016 | Her ....................... | G09G 3/3233 |
| 2017/0025068 A1* | 1/2017 | Jeoung ................. | G11C 19/28 |
| 2017/0116920 A1* | 4/2017 | Kwon .................. | G09G 3/3266 |
| 2018/0083217 A1* | 3/2018 | Chung ................. | G09G 3/3208 |
| 2018/0114488 A1* | 4/2018 | Jung ..................... | G09G 3/3258 |
| 2018/0190190 A1* | 7/2018 | Xi ........................ | G09G 3/3225 |
| 2019/0005866 A1* | 1/2019 | Li ......................... | G11C 19/28 |

(Continued)

*Primary Examiner* — Prabodh M Dharia
(74) *Attorney, Agent, or Firm* — Tarolli, Sundheim, Covell & Tummino LLP

(57) ABSTRACT

In an organic light-emitting display panel, a display area and a peripheral area surrounding the display area are provided on the base substrate, and the display area includes a display sub-area and a fingerprint recognition sub-area. A plurality of pixel driving circuits and a plurality of organic light-emitting components are arranged in the display area, and the organic light-emitting components are electrically connected to the pixel driving circuits in one-to-one correspondence. The first emission driving circuit is arranged in the peripheral area and electrically connected to pixel driving circuits arranged in the display sub-area. The second emission driving circuit is arranged in the peripheral area and electrically connected to pixel driving circuits arranged in the fingerprint recognition sub-area.

18 Claims, 13 Drawing Sheets

(56) References Cited

U.S. PATENT DOCUMENTS

| | | | |
|---|---|---|---|
| 2019/0018540 A1* | 1/2019 | Ko | G06F 3/0418 |
| 2019/0051708 A1* | 2/2019 | Jeong | G06F 3/0416 |
| 2019/0279566 A1* | 9/2019 | Wang | G06K 9/0004 |
| 2019/0280039 A1* | 9/2019 | Jia | H01L 27/14678 |
| 2019/0303638 A1* | 10/2019 | Zeng | G06F 21/32 |
| 2019/0370523 A1* | 12/2019 | Gao | G06K 9/0004 |

* cited by examiner

ORGANIC LIGHT-EMITTING DISPLAY PANEL, METHOD FOR DRIVING THE SAME, AND ORGANIC LIGHT-EMITTING DISPLAY DEVICE

CROSS-REFERENCE TO RELATED APPLICATIONS

The present disclosure claims priority to Chinese Patent Application No. 201810697105.5, filed on Jun. 29, 2018, the content of which is incorporated herein by reference in its entirety.

TECHNICAL FIELD

The present disclosure relates to the field of display technologies, and in particular, to an organic light-emitting display panel, a method for driving the display panel, and an organic light-emitting display device.

BACKGROUND

With the development of the flat panel display technologies, the organic light-emitting display device (Organic Light-Emitting Display, OLED) has more and more applications due to its excellent characteristics such as self-illumination, high brightness, wide viewing angle and fast response. Along with this, more and more requirements are brought for the organic light-emitting display device, such as how to integrate fingerprint recognition into the organic light-emitting display device.

Currently, the organic light-emitting display device with fingerprint recognition function includes a light source and a sensor. The organic light-emitting diode is usually reused as the light source. During the fingerprint recognition process, light emitted by the organic light-emitting diode corresponding to the fingerprint recognition area is reflected by the fingerprint, and the sensor performs fingerprint recognition based on the received light reflected by the fingerprint.

In the related art, during the conventional display process, the organic light-emitting display device usually has a small brightness, and in the fingerprint recognition process, the fingerprint recognition area usually has a large brightness, so that the light received by the sensor has an increased brightness and the fingerprint recognition is more accurate. Therefore, when switching from the conventional display process to the fingerprint recognition process, the brightness of the organic light-emitting display device needs to be switched, that is, the brightness of the organic light-emitting display device changes abruptly, thereby influencing the display effect of the organic light-emitting display device.

SUMMARY

The present disclosure provides an organic light-emitting display panel, a method for driving the display panel, and an organic light-emitting display device. The brightness of organic light-emitting components in a display sub-area and the brightness of organic light-emitting components in a fingerprint recognition sub-area can be independently controlled, such that the brightness of the overall organic light-emitting display panel will not change abruptly.

In a first aspect, the present disclosure provides an organic light-emitting display panel. The organic light-emitting display panel includes: a base substrate, wherein a display area and a peripheral area surrounding the display area are provided on the base substrate, and the display area comprises a display sub-area and a fingerprint recognition sub-area; a plurality of pixel driving circuits and a plurality of organic light-emitting components, wherein the plurality of pixel driving circuits and the plurality of organic light-emitting components are arranged in the display area, and the plurality of organic light-emitting components is electrically connected to the plurality of pixel driving circuits in one-to-one correspondence; a first emission driving circuit arranged in the peripheral area and electrically connected to at least one of the plurality of pixel driving circuits that is arranged in the display sub-area; a second emission driving circuit arranged in the peripheral area and electrically connected to at least one of the plurality of pixel driving circuits that is arranged in the fingerprint recognition sub-area; a scan driving circuit arranged in the peripheral area and electrically connected to the plurality of pixel driving circuits in the display area; and a fingerprint recognition sensor arranged at a side of the plurality of organic light-emitting components facing toward the base substrate. An orthographic projection of the fingerprint recognition sensor on a plane of the base substrate is located within the fingerprint recognition sub-area.

In a second aspect, the present disclosure provides an organic light-emitting display device, and the organic light-emitting display device includes the abovementioned organic light-emitting display panel.

In a third aspect, the present disclosure provides a method for driving the abovementioned organic light-emitting display panel. Each frame of the organic light-emitting display panel is a display frame or a fingerprint recognition frame. The method includes steps of: in the display frame, providing, by the scan driving circuit, a scan signal to the plurality of pixel driving circuits in the display area; providing, by the first emission driving circuit, a first emission signal to the at least one of the plurality of pixel driving circuits that is arranged in the display sub-area; and providing, by the second emission driving circuit, a second emission signal to the at least one of the plurality of pixel driving circuits that is arranged in the fingerprint recognition sub-area; a number of occurrences of high levels of the first emission signal is the same as a number of occurrences of high levels of the second emission signal, and each high level of the first emission signal has a same duration as that of a corresponding high level of the second emission signal; and in the fingerprint recognition frame, providing, by the scan driving circuit, a scan signal to the plurality of pixel driving circuits in the display area; providing, by the first emission driving circuit, a first emission signal to the at least one of the plurality of pixel driving circuits that is arranged in the display sub-area; providing, by the second emission driving circuit, a third emission signal to the at least one of the plurality of pixel driving circuits that is arranged in the fingerprint recognition sub-area; receiving, by the fingerprint recognition sensor, light reflected by a fingerprint, to perform fingerprint recognition, a number of occurrences of high levels of the third emission signal is smaller than the number of occurrences of high levels of the first emission signal, and/or each high level of the third emission signal has a shorter duration than that of a corresponding high level of the first emission signal.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. Obviously, the drawings described as follows are merely part of the embodiments of the present disclosure, other drawings can also be acquired by those skilled in the art without paying creative efforts.

DESCRIPTION OF EMBODIMENTS

In order to make the purpose, technical solutions, and advantages of the embodiments of the present disclosure to be clearer, the technical solutions in the embodiments of the present disclosure are described in the following with reference to the accompanying drawings. The described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

It should be noted that the technical features in the embodiments of the present disclosure may be combined with each other.

Figure 1:
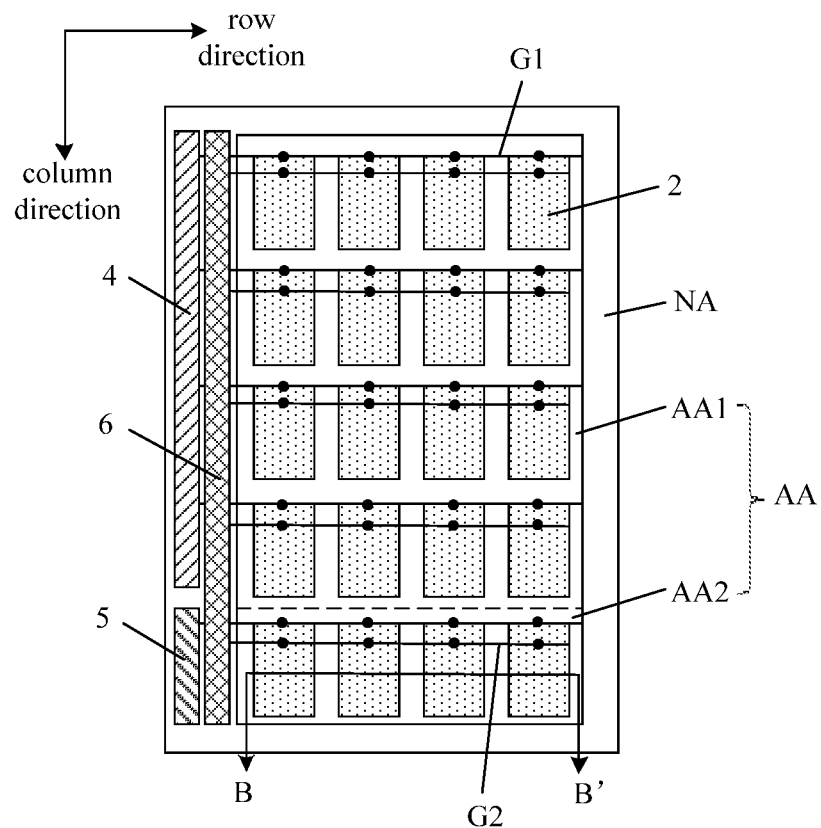
FIG. 1 is top view I of an organic light-emitting display panel according to an embodiment of the present disclosure.
Figure 2:
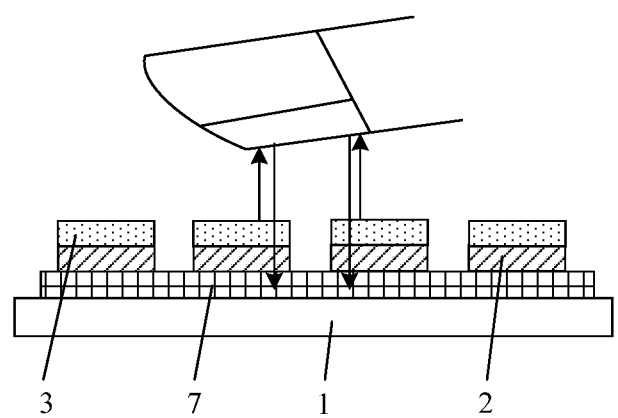
FIG. 2 is cross-sectional view I along line BB' of FIG. 1 according to an embodiment of the present disclosure.
Figure 3:
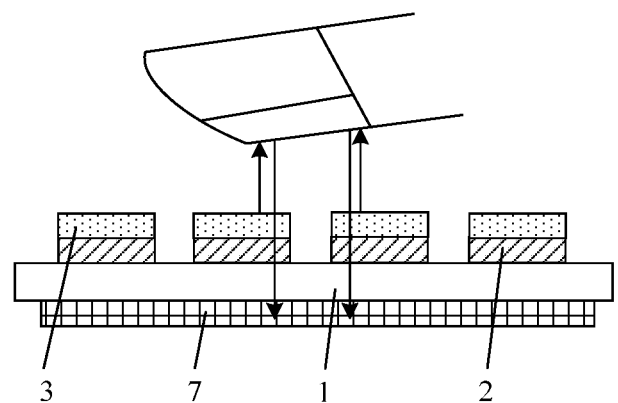
FIG. 3 is cross-sectional view II along line BB' of FIG. 1 according to an embodiment of the present disclosure.

An embodiment of the present disclosure provides an organic light-emitting display panel, as shown in FIG. 1, FIG. 2 and FIG. 3. FIG. 1 is top view I of an organic light-emitting display panel according to an embodiment of the present disclosure, FIG. 2 is cross-sectional view I along line BB' of FIG. 1 according to an embodiment of the present disclosure, and FIG. 3 is cross-sectional view II along line BB' of FIG. 1 according to an embodiment of the present disclosure. The organic light-emitting display panel includes a base substrate 1, a plurality of pixel driving circuits 2, a plurality of organic light-emitting components 3, a first emission driving circuit 4, a second emission driving circuit 5, a scan driving circuit 6, and a fingerprint recognition sensor 7.

A display area AA and a peripheral area NA surrounding the display area AA are provided on the base substrate 1, and the display area AA includes a display sub-area AA1 and a fingerprint recognition sub-area AA2.

The plurality of pixel driving circuits 2 and the plurality of organic light-emitting components 3 are arranged in the display area AA, and the plurality of organic light-emitting components 3 is electrically connected to the plurality of pixel driving circuits 2 in one-to-one correspondence.

The first emission driving circuit 4 is arranged in the peripheral area NA and electrically connected to at least one of the plurality of pixel driving circuits 2 that is arranged in the display sub-area AA1 (black dots in FIG. 1 indicate electrical connections).

The second emission driving circuit 5 is arranged in the peripheral area NA and electrically connected to at least one of the plurality of pixel driving circuits 2 that is arranged in the fingerprint recognition sub-area AA2.

The scan driving circuit 6 is arranged in the peripheral area NA and electrically connected to at least one of the plurality of pixel driving circuits 2 that is arranged in the display area AA.

The fingerprint recognition sensor 7 is arranged at a side of the plurality of organic light-emitting components 3 facing toward the base substrate 1, and an orthographic projection of the fingerprint recognition sensor 7 on a plane of the base substrate 1 is located within the fingerprint recognition sub-area AA2.

The display sub-area AA1 is used for conventional display both in the conventional display process and in the fingerprint recognition process. The fingerprint recognition sub-area AA2 is used for conventional display in the conventional display process, and is used for both display and fingerprint recognition in the fingerprint recognition process. The fingerprint recognition sub-area AA2 can be located anywhere within the display area AA of the organic light-emitting display panel, which will be further described by examples in the following.

In the organic light-emitting display panel having the abovementioned structure, the brightness of the organic light-emitting component 3 within the display sub-area AA1 is controlled by the first emission driving circuit 4, and the brightness of the organic light-emitting component 3 within the fingerprint recognition sub-area AA2 is controlled by the second emission driving circuit 5. In this way, the brightness of the display sub-area AA1 and the brightness of the fingerprint recognition sub-area AA2 of the organic light-emitting display panel can be independently controlled. When switching from the conventional display process to the fingerprint recognition process, the second emission driving circuit 5 controls the brightness of the organic light-emitting component 3 within the fingerprint recognition sub-area AA2 to increase, and the brightness of the organic light-emitting component 3 within the display sub-area AA1 remains unchanged. In this way, the brightness of the overall organic light-emitting display panel will not change abruptly, thereby facilitating the better display effect of the organic light-emitting display panel.

In the conventional display process, both the display sub-area AA1 and the fingerprint recognition sub-area AA2 have low brightness, so that the organic light-emitting display device has low energy consumption, and the user's eyes are not excessively stimulated. That is, as shown in the FIG. 4, which is a sequence diagram of operations during a conventional display process of FIG. 1 according to an embodiment of the present disclosure, there is a long duration in one frame during which the organic light-emitting components 3 within the display sub-area AA1 and the fingerprint recognition sub-area AA2 do not emit light.

The pixel driving circuit includes a switching transistor and a driving transistor. The switching transistor is configured to control whether an anode signal can arrive at a first terminal of the driving transistor or not, and the driving transistor is configured to control a magnitude of a current of the anode signal passing through it and reaching the organic light-emitting component. The switching transistor is controlled by an emission signal (a collective name of the first emission signal and the second emission signal), and the driving transistor is controlled by a scan signal. In an example, both the switching transistor and the driving transistor are PMOS transistors. When the emission signal is at a high level, the switching transistor is switched off, and the light-emitting component does not emit light. The longer the duration of the high level of the emission signal is, the lower the brightness of the display area is. Therefore, in one frame, setting the duration of the high level of the first emission signal provided by the first emission driving circuit 4 and the duration of the high level of the second emission signal provided by the second emission driving circuit 5 to be long can allow the organic light-emitting components 3 within the display sub-area AA1 and the fingerprint recognition sub-area AA2 to not emit light for a long duration, and thus both the display sub-area AA1 and the fingerprint recognition sub-area AA2 have low brightness, thereby resulting in the low energy consumption for the organic light-emitting display device without excessively stimulating the user's eyes.

Figure 4:
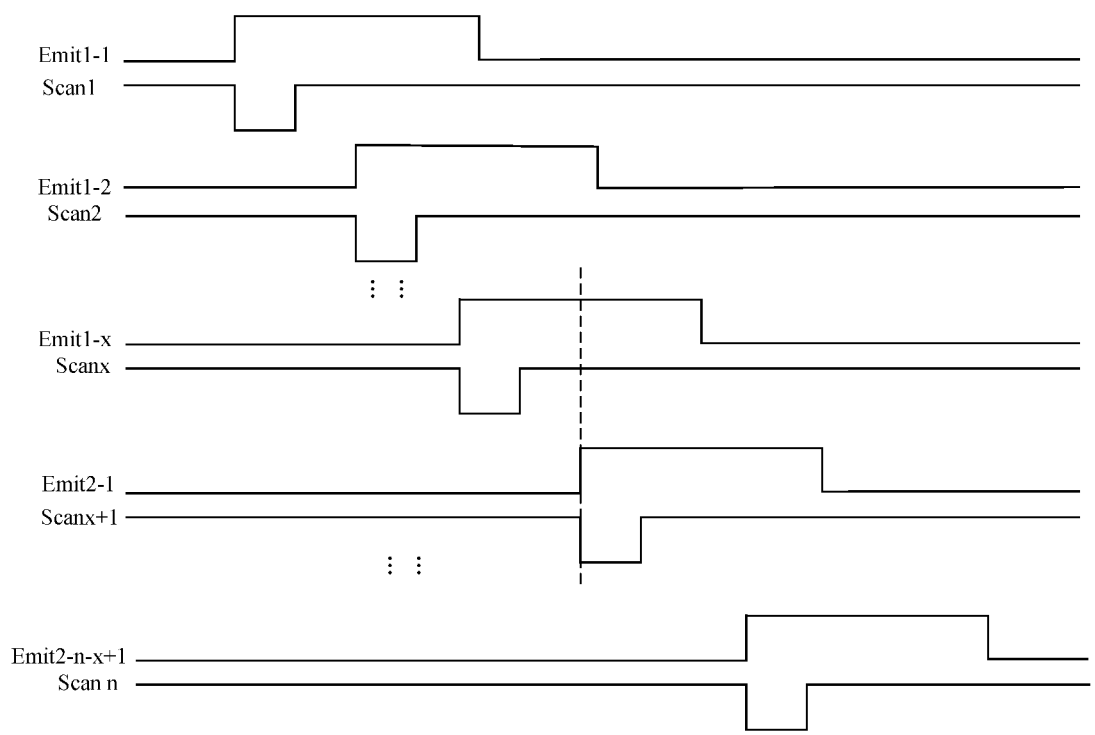
FIG. 4 is a sequence diagram of operations during a conventional display process of FIG. 1 according to an embodiment of the present disclosure.

As shown in FIG. 4, the reference sign Emit1-1 refers to an output signal of the first emission driving circuit 4 corresponding to a first low of pixel driving circuits 2 within the display sub-area AA1, the reference sign EmiT2-1 refers to an output signal of the second emission driving circuit 5 corresponding to a first row of pixel driving circuits 2 within the fingerprint recognition sub-area AA2, the reference sign Scant refers to an output signal of the scan driving circuit 6 corresponding to a first row of pixel driving circuits 2 within the display area AA, and the other reference signs may be comprehended in the same manner.

Figure 5:
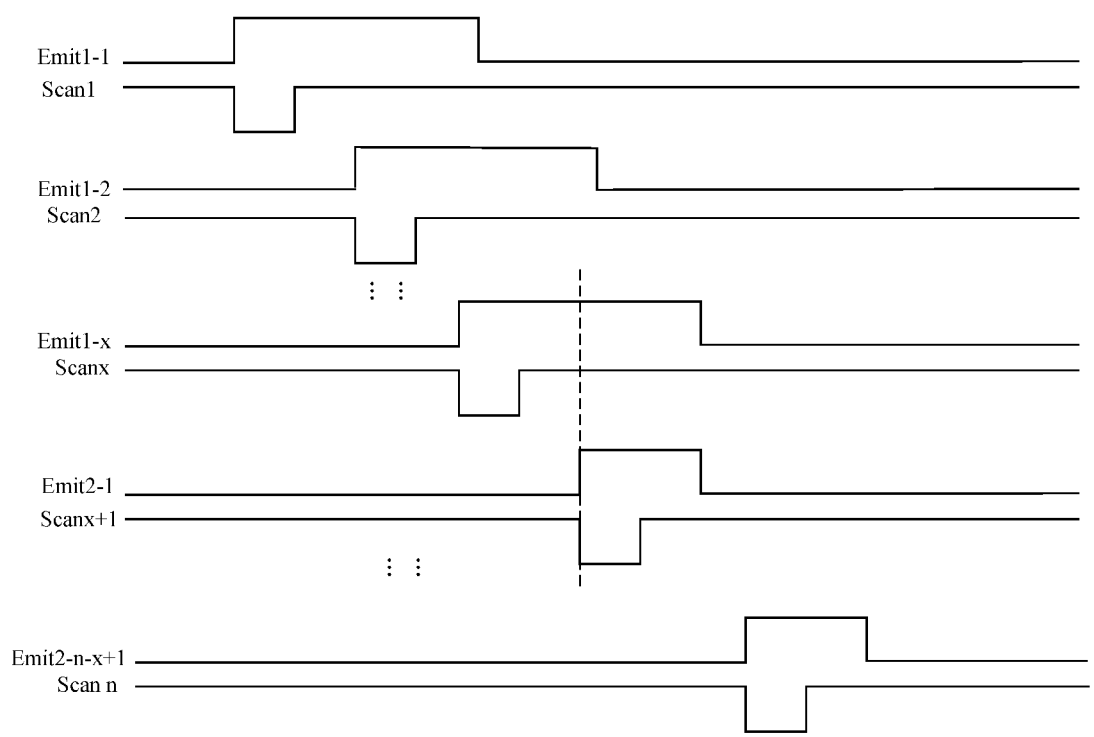
FIG. 5 is a sequence diagram of operations during a fingerprint recognition process of FIG. 1 according to an embodiment of the present disclosure.

In the fingerprint recognition process, the brightness of the display sub-area AA1 is still low (consistent with the conventional display process), and the brightness of the fingerprint recognition sub-area AA2 is high, so as to increase the brightness of light received by the fingerprint recognition sensor 7 (i.e., the light that is firstly emitted from the organic light-emitting component 3 and then reflected by the fingerprint), thereby making fingerprint recognition more accurate. That is, as shown in FIG. 5, which is a sequence diagram of operations during a fingerprint recognition process of FIG. 1 according to an embodiment of the present disclosure, the reference signs in FIG. 5 are illustrated as the same manner as those in FIG. 4 and will not be further described herein. In one frame, the organic light-emitting components 3 within the display sub-area AA1 do not emit light for a long duration, and the organic light-emitting components 3 within the fingerprint recognition sub-area AA2 do not emit light for a short duration.

The pixel driving circuit includes a switching transistor and a driving transistor, and the switching transistor is configured to control whether an anode signal can arrive at a first terminal of the driving transistor, and the driving transistor is configured to control a magnitude of a current of the anode signal passing through it and reaching the organic light-emitting component. The switching transistor is controlled by an emission signal (a collective name of the first emission signal and the second emission signal), and the driving transistor is controlled by a scan signal. In an example, both the switching transistor and the driving transistor are PMOS transistors. When the emission signal is at a high level, the switching transistor is switched off, and the light-emitting component does not emit light. The longer the duration of the high level of the emission signal is, the lower the brightness of the display area is. Therefore, in one frame, setting the duration of the high level of the first emission signal provided by the first emission driving circuit 4 to be long and the duration of the high level of the second emission signal provided by the second emission driving circuit 5 to be short can allow the organic light-emitting components 3 within the display sub-area AA1 to not emit light for a long duration and the organic light-emitting components 3 within the fingerprint recognition sub-area AA2 to not emit light for a short duration, and thus the display sub-area AA1 has low brightness and the fingerprint recognition sub-area AA2 has high brightness, thereby increasing the brightness of light received by the fingerprint recognition sensor 7 and thus making fingerprint recognition more accurate.

The abovementioned "the fingerprint recognition sensor 7 being arranged at a side of the plurality of organic light-emitting components 3 facing toward the base substrate 1" means that the fingerprint recognition sensor 7 is disposed in a direction from the plurality of organic light-emitting components 3 toward the base substrate 1. That is, only the positional relationship between the plurality of organic light-emitting components 3 and the fingerprint recognition sensor 7 is defined, but the positional relationship between the fingerprint recognition sensor 7 and the base substrate 1 is not defined. In an example, as shown in FIG. 2, the fingerprint recognition sensor 7 is arranged at the side of the plurality of organic light-emitting components 3 facing toward the base substrate 1 and is located between the plurality of organic light-emitting components 3 and the base substrate 1. In another example, as shown in FIG. 3, the fingerprint recognition sensor 7 is arranged at the side of the plurality of organic light-emitting components 3 facing toward the base substrate 1 and is located at a side of the base substrate 1 facing away from the plurality of organic light-emitting components 3.

In an embodiment, as shown in FIG. 2 and FIG. 3, in a direction perpendicular to the base substrate 1, the organic light-emitting components 3 within the display area AA are arranged at a side of the pixel driving circuit 2 facing away from the base substrate 1, so that in the display process, the opaque structure in the pixel driving circuit 2 would not block the light emitted by the organic light-emitting component 3, thereby resulting in the high brightness of the organic light-emitting display panel.

For better illustrating the present disclosure, implementation manners of the first emission driving circuit 4 and the second emission driving circuit 5 will be described in the following embodiments by way of examples that the fingerprint recognition sub-area AA2 is arranged at different positions.

In a first example, as shown in FIG. 1, a plurality of pixel driving circuits 2 is distributed in n rows and m columns, the display sub-area AA1 and the fingerprint recognition sub-area AA2 are arranged along a column direction of the plurality of pixel driving circuits 2, x rows of pixel driving circuits 2 are arranged in the display sub-area AA1, and (n−x) rows of pixel driving circuits 2 are arranged in the fingerprint recognition sub-area AA2, where n and m are positive integers greater than 1 and x is a positive integer greater than or equal to 1 and smaller than n. The specific value of x can be reasonably selected according to the size of the pixel driving circuit 2 in the column direction and the size of the fingerprint, so that the size of the fingerprint recognition sub-area AA2 is sufficient for fingerprint recognition and does not excessively occupy the display area AA.

Based on this, implementation manners of a first emission driving circuit 4 and a second emission driving circuit 5 can be described as follows.

Figure 6:
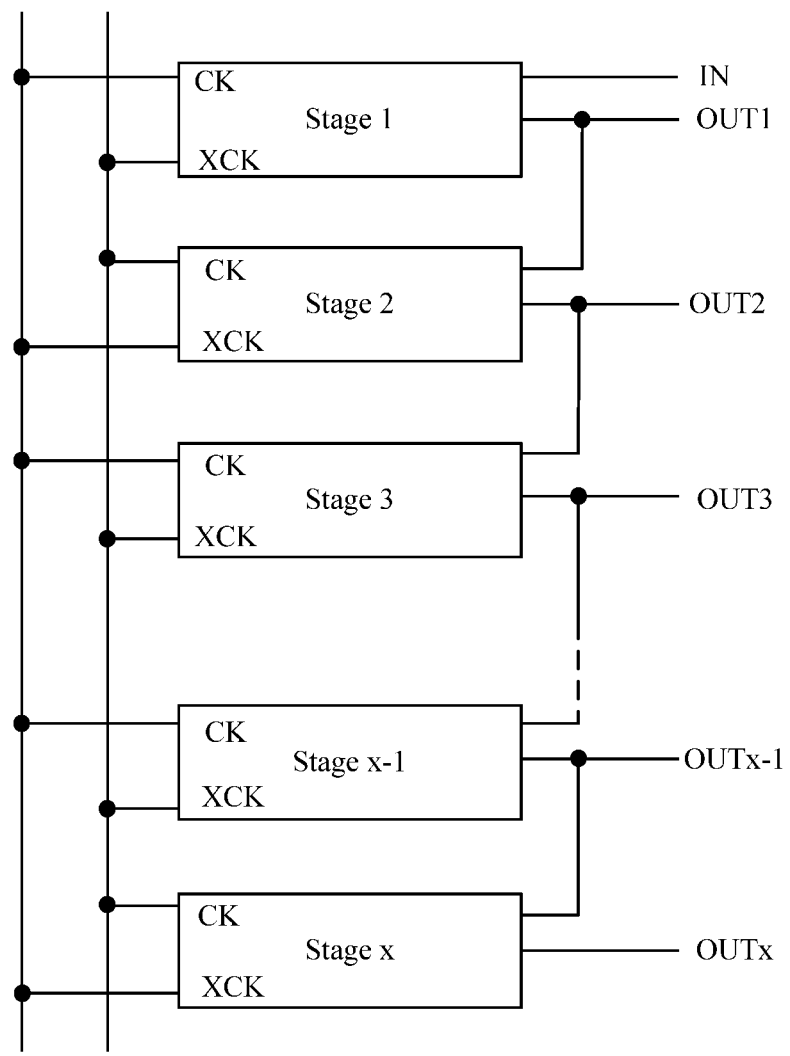
FIG. 6 is schematic structural diagram I of a first emission driving circuit according to an embodiment of the present disclosure.

As shown in FIG. 6, which is schematic structural diagram I of a first emission driving circuit according to an embodiment of the present disclosure, the first emission driving circuit 4 includes x stages of first shift registers cascaded with each other (illustrated as Stage 1-Stage x in FIG. 6), and output terminals of a first stage of first shift register to an $x^{th}$ stage of first shift register are electrically connected to a first row of pixel driving circuits 2 to an $x^{th}$ row of pixel driving circuits 2, respectively. In this way, the output terminals of the first stage of first shift register to the $x^{th}$ stage of first shift register can sequentially output a first emission signal to the first row of pixel driving circuits 2 to the $x^{th}$ row of pixel driving circuits 2, to perform row-by-row control on light emission of the organic light-emitting components 2 within the display sub-area AA1.

The abovementioned "output terminals of a first stage of first shift register to an $x^{th}$ stage of first shift register being electrically connected to a first row of pixel driving circuits 2 to an $x^{th}$ row of pixel driving circuits 2" may be achieved by the following manner. As shown in FIG. 1, the organic light-emitting display panel is provided with a plurality of first gate lines G1, one of which is electrically connected to a respective one row of pixel driving circuits 2, and the output terminals of the first stage of first shift register to the $x^{th}$ stage of first shift register are electrically connected to a first gate line to an $x^{th}$ first gate line, respectively.

Figure 7:
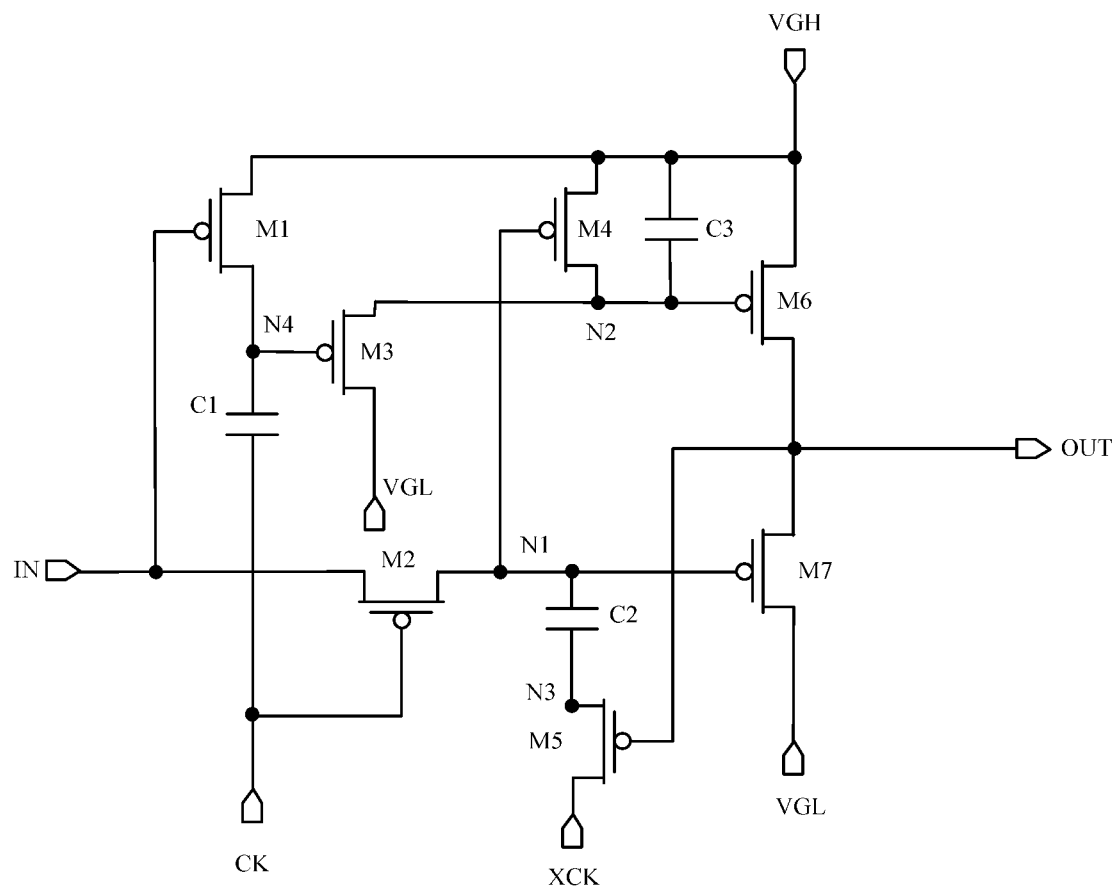
FIG. 7 is a schematic circuit diagram of a first shift register according to an embodiment of the present disclosure.

In an embodiment, as shown in FIG. 7, which is a schematic circuit diagram of a first shift register according to an embodiment of the present disclosure, the first shift register includes a first transistor M1, a second transistor M2, a third transistor M3, a fourth transistor M4, a fifth transistor M5, a sixth transistor M6, a seventh transistor M7, a first capacitor C1, a second capacitor C2, and a third capacitor C3.

The first transistor M1 has a control terminal electrically connected to an input signal terminal IN, a first terminal electrically connected to a high level signal terminal VGH, and a second terminal electrically connected to a fourth node N4. The second transistor M2 has a control terminal electrically connected to a first clock signal terminal CK, a first terminal electrically connected to the input signal terminal IN, and a second terminal electrically connected to a first node N1. The third transistor M3 has a control terminal electrically connected to the fourth node N4, a first terminal electrically connected to a low level signal terminal VGL, and a second terminal electrically connected to a second node N2. The fourth transistor M4 has a control terminal electrically connected to the first node N1, a first terminal electrically connected to the high level signal terminal VGH, and a second terminal electrically connected to the second node N2. The fifth transistor M5 has a control terminal electrically connected to an output signal terminal OUT, a first terminal electrically connected to a second clock signal terminal XCK, and a second terminal electrically connected to a third node N3. The sixth transistor M6 has a control terminal electrically connected to the second node N2, a first terminal electrically connected to the high level signal terminal VGH, and a second terminal electrically connected to the output terminal OUT. The seventh transistor M7 has a control terminal electrically connected to the first node N1, a the first terminal electrically connected to the low level signal terminal VGL, and a second terminal electrically connected to the output terminal OUT. The first capacitor C1 has a first terminal electrically connected to the first clock signal terminal CK, and a second terminal electrically connected to the fourth node N4. The second capacitor C2 has a first terminal electrically connected to the first node N1, and a second terminal electrically connected to a fifth node N5. The third capacitor C3 has a first terminal electrically connected to the high level signal terminal VGH, and a second terminal electrically connected to the second node N2. The first transistor M1 to the seventh transistor M7 can be PMOS transistors, each of which is switched on when its control terminal is at a low level and switched off when its control terminal is at a high level.

Figure 8:
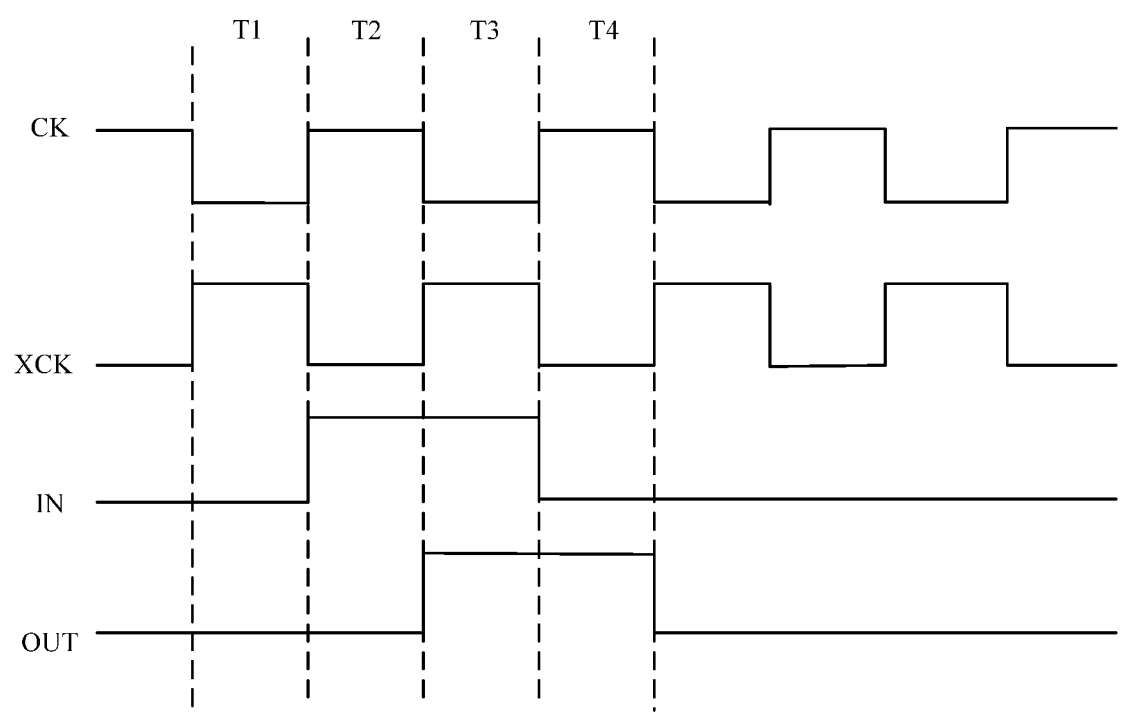
FIG. 8 is a sequence diagram of operations of a first shift register according to an embodiment of the present disclosure.

As shown in FIG. 8, which is a sequence diagram of operations of a first shift register according to an embodiment of the present disclosure, the operating process of the first shift register includes the following phase.

In a first phase T1, the input signal terminal IN provides an input signal at a low level, the first clock signal terminal CK provide a first clock signal at a low level, and the second clock signal terminal XCK provides a second clock signal at a high level. The first transistor M1 is controlled by the input signal to be turned on. A high level signal provided by the high level signal terminal VGH reaches the fourth node N4 through the first transistor M1. The fourth node N 4 is at a high level. The third transistor M3 is turned off. The second transistor M2 is controlled by the first clock signal to be turned on. The input signal reaches the first node N1 through the second transistor M2. The first node N1 is at a low level. The fourth transistor M4 is turned on. The high level signal provided by the high level signal terminal VGH reaches the second node N2 through the fourth transistor M4. The second node N2 is at a high level. The seventh transistor M7 is turned on under the low level of the first node N1. The sixth transistor M6 is turned off under the high level of the second node N2. A low level signal provided by the low level signal terminal VGL reaches the output terminal OUT through the seventh transistor M7. The output terminal OUT outputs the low level. The fifth transistor M5 is turned on. The second clock signal provided by the second clock signal terminal XCK reaches the third node N3. The third node N3 is at a high level.

In a second phase T2, the input signal is at a high level, the first clock signal is at a high level, and the second clock signal is at a low level. The first transistor M1 is controlled by the input signal to be turned off. The fourth node N4 is suspended. Since the first clock signal is changed from a low level in the first phase T1 to a high level, the level of the fourth node N4 becomes higher under the coupling of the first capacitor C. The third transistor M3 is turned off. The second transistor M2 is controlled by the first clock signal to be turned off. The second capacitor C2 discharges to maintain the first node N1 at the low level. The fourth transistor M4 is turned on. The high level signal provided by the high level signal terminal VGH reaches the second node N2 through the fourth transistor M4. The second node N2 is at a high level. The seventh transistor M7 is turned on under the low level of the first node N1. The sixth transistor M6 is turned off under the high level of the second node N2. The low level signal provided by the low level signal terminal VGL reaches the output terminal OUT through the seventh transistor M7. The output terminal OUT outputs the low level. The fifth transistor M5 is turned on. The second clock signal provided by the second clock signal terminal XCK reaches the third terminal Node N3. The third node N3 is at a low level.

In a third phase T3, the input signal is at a high level, the first clock signal is at a low level, and the second clock signal is at a high level. The first transistor M1 is controlled by the input signal to be turned off. The fourth node N4 is suspended. Since the first clock signal is changed from the high level in the second phase T2 to a low level. The level of the fourth node N4 is pulled low under the coupling of the first capacitor C1. The fourth node N4 is at a low level. The third transistor M3 is turned on. The low level signal provided by the low level signal terminal VGL reaches the second node N2 through the third transistor M3. The second node N2 is at a low level. The second transistor M2 is controlled by the first clock signal to be turned on. The input signal reaches the first node N1 through the second transistor M2. The first node N1 is at a high level. The fourth transistor M4 is turned off. The seventh transistor M7 is turned off under the high level of the first node N1. The sixth transistor M6 is turned on under the low level of the second node N2. The high level signal provided by the high level signal terminal VGH reaches the output terminal OUT through the sixth transistor M6. The output terminal OUT outputs the high level. The fifth transistor M5 is turned off. The third node N3 is suspended.

In a fourth phase T4, the input signal is at a low level, the first clock signal is at a high level, and the second clock signal is at a low level. The first transistor M1 is controlled by the input signal to be turned on. The high level signal provided by the high level signal terminal VGH reaches the fourth node N4 through the first transistor M1. The fourth node N4 is at a high level. The third transistor M3 is turned off. The second transistor M2 is controlled by the first clock signal to be turned off. The second capacitor C2 discharges to maintain the first node N1 at the high level. The fourth transistor M4 is turned off. The seventh transistor M7 is turned off under the high level of the first node N1. The third capacitor C3 discharges to maintain the second node N2 at the low level. The sixth transistor M6 is turned on under the low level of the second node N2. The high level signal provided by the high level signal terminal VGH reaches the output terminal OUT through the sixth transistor M6. The output terminal OUT outputs the high level. The fifth transistors M5 is turned off. The third node N3 is suspended.

It should be noted that the high-level signal terminal VGH provides a high-level signal in the first phase T1 to the fourth phase T4, and the low-level signal terminal VGL provides a low level signal from the first phase T1 to the fourth phase T4. Moreover, the first clock signal and the second clock signal have a same frequency, there is no overlap between enable levels of the first clock signal and the second clock signal, and there is overlap or no overlap between non-enable levels of the first clock signal and the second clock signal. In an example as shown in FIG. 4, the enable levels of the first clock signal and the second clock signal are both low levels, and the non-enable levels of the first clock signal and the second clock signal are both high levels. There is no overlap between low levels of the first clock signal and the second clock signal, and there is no overlap between high levels of the first clock signal and the second clock signal.

In an example, as shown in FIG. 6, an output terminal of a first stage of first shift register is electrically connected to a signal input terminal of a $2^{nd}$ stage of first shift register, an output terminal of the $2^{nd}$ stage of first shift register is electrically connected to a signal input terminal of a $3^{rd}$ stage of first shift register, and so on. In this way, an output signal of a previous stage of first shift register can directly serve as an input signal of a next stage of first shift register, thereby simplifying the structure of the first emission driving circuit 4.

Figure 9:
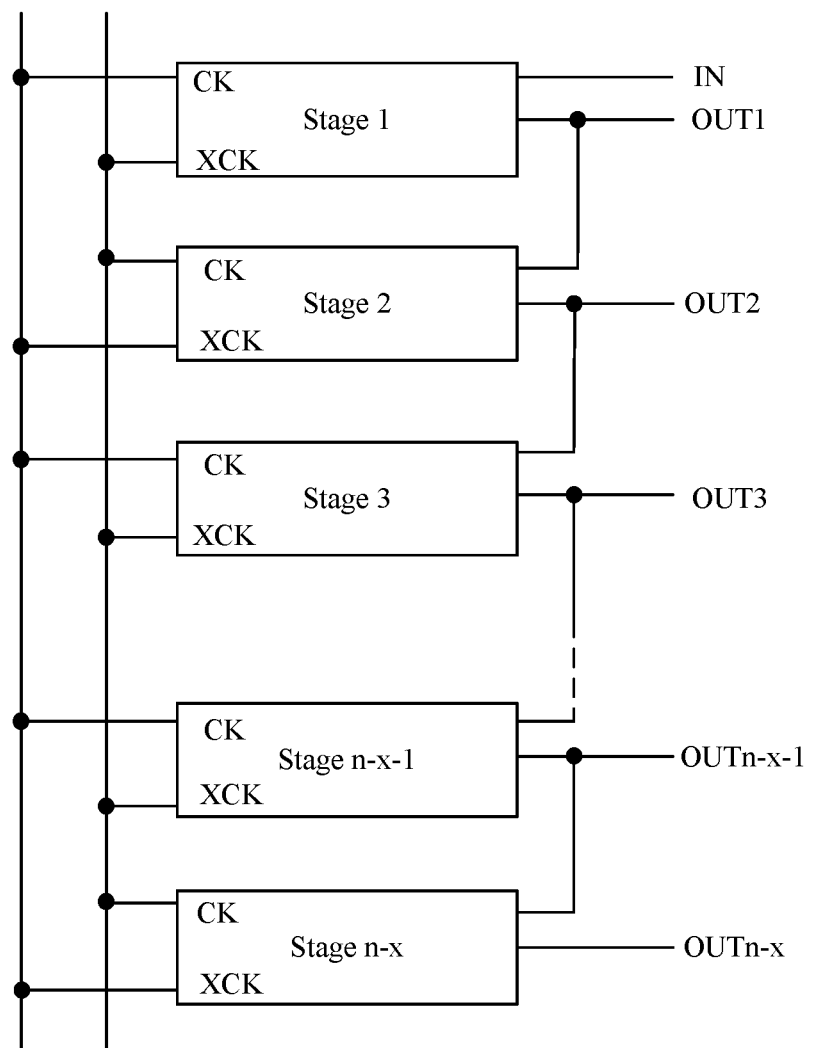
FIG. 9 is schematic structural diagram I of a second emission driving circuit according to an embodiment of the present disclosure.

As shown in FIG. 9, which is schematic structural diagram I of a second emission driving circuit according to an embodiment of the present disclosure, the second emission driving circuit 5 includes (n−x) stages of second shift registers cascaded with each other (illustrated as Stage 1-Stage (n−x) in FIG. 9), and output terminals of a first stage of second shift register to an $(n-x)^{th}$ stage of second shift register are electrically connected to an $(x+1)^{th}$ row of pixel driving circuits 2 to an $n^{th}$ row of pixel driving circuits 2, respectively. In this way, the output terminals of the first stage of second shift register to the $(n-x)^{th}$ stage of second shift register can sequentially output a second emission signal to the $(x+1)^{th}$ row of pixel driving circuits 2 to the $n^{th}$ row of pixel driving circuits 2, so as to row-by-row control light emission of the organic light-emitting components 2 within the fingerprint recognition sub-area AA2.

The abovementioned "output terminals of a first stage of second shift register to an $(n-x)^{th}$ stage of second shift register being electrically connected to an $(x+1)^{th}$ row of pixel driving circuits 2 to an $n^{th}$ row of pixel driving circuits 2" may be achieved by the following manner. As shown in FIG. 1, the organic light-emitting display panel is provided with a plurality of second gate lines G2, each of which is electrically connected to a respective one row of pixel driving circuits 2, and the output terminals of the first stage of second shift register to the $(n-x)^{th}$ stage of second shift register are electrically connected to an $(x+1)^{th}$ second gate line to an $n^{th}$ second gate line, respectively.

Refer to the first shift register for the circuit structure and operating sequence of the second shift register, which will not be further described herein.

In this example, a start time of the input signal of the first stage of second shift register in the second emission driving circuit can be the same as a start time of the output signal of the $x^{th}$ stage of first shift register (i.e., the last stage of first shift register), thereby performing row-by-row driving on the organic light-emitting display panel and thus achieving display.

In this example, as shown in FIG. 1, the first emission driving circuit 4 and the second emission driving circuit 5 are sequentially arranged along the column direction of the pixel driving circuits 2. In a row direction of the pixel driving circuits 2, the first emission driving circuit 4 corresponds to the display sub-area AA1, and the second emission driving circuit 5 corresponds to the fingerprint recognition sub-area AA2. In this way, the first emission driving circuit 4 can be easily connected to the pixel driving circuits 2 within the display sub-area AA1, and the second emission driving circuit 5 can be easily connected to the pixel driving circuits 2 within the fingerprint recognition sub-area AA2.

In an embodiment, the scan driving circuit 6 is arranged at a side of the first emission driving circuit 4 and the second emission driving circuit 5 facing toward the display area AA, so that in the row direction of the pixel driving circuits 2, the scan driving circuit 6 can well correspond to all rows of pixel driving circuits 2, thereby simplifying connection between the scan driving circuit 6 and the pixel driving circuits 2.

Figure 10:
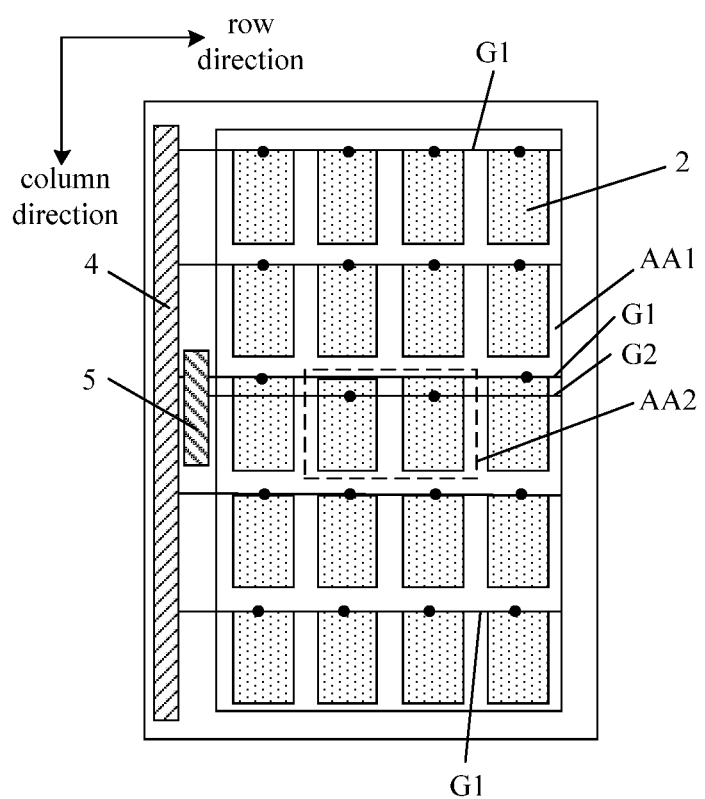
FIG. 10 is top view II of an organic light-emitting display panel according to an embodiment of the present disclosure.

In a second example, as shown in FIG. 10, which is top view II of an organic light-emitting display panel according to an embodiment of the present disclosure, the plurality of pixel driving circuits 2 is distributed in n rows and m columns, the display sub-area AA1 surrounds at least a portion of the fingerprint recognition sub-area AA2, and pixel driving circuits 2 in a $y_1^{th}$ column to a $y_2^{th}$ column of an $x_1^{th}$ row to an $x_2^{th}$ row are located within the fingerprint recognition sub-area AA2, where $x_1$, $x_2$, $y_1$, and $y_2$ are all positive integers, $1 \leq x_1 < n$, $x_1 < x_2 \leq n$, $1 \leq y_1 < m$, $y_1 < y_2 \leq m$, and n and m are both positive integers greater than 1. Here, values of $x_1$, $x_2$, $y_1$ and $y_2$ can be reasonably selected according to the size of the pixel driving circuit 2 in the row direction and column direction and the size of the fingerprint, such that the size of the fingerprint recognition sub-area AA2 is sufficient for fingerprint recognition and does not excessively occupy the display area AA.

Based on this, implementation manners of the first emission driving circuit 4 and the second emission driving circuit 5 can be described as follows.

Figure 11:
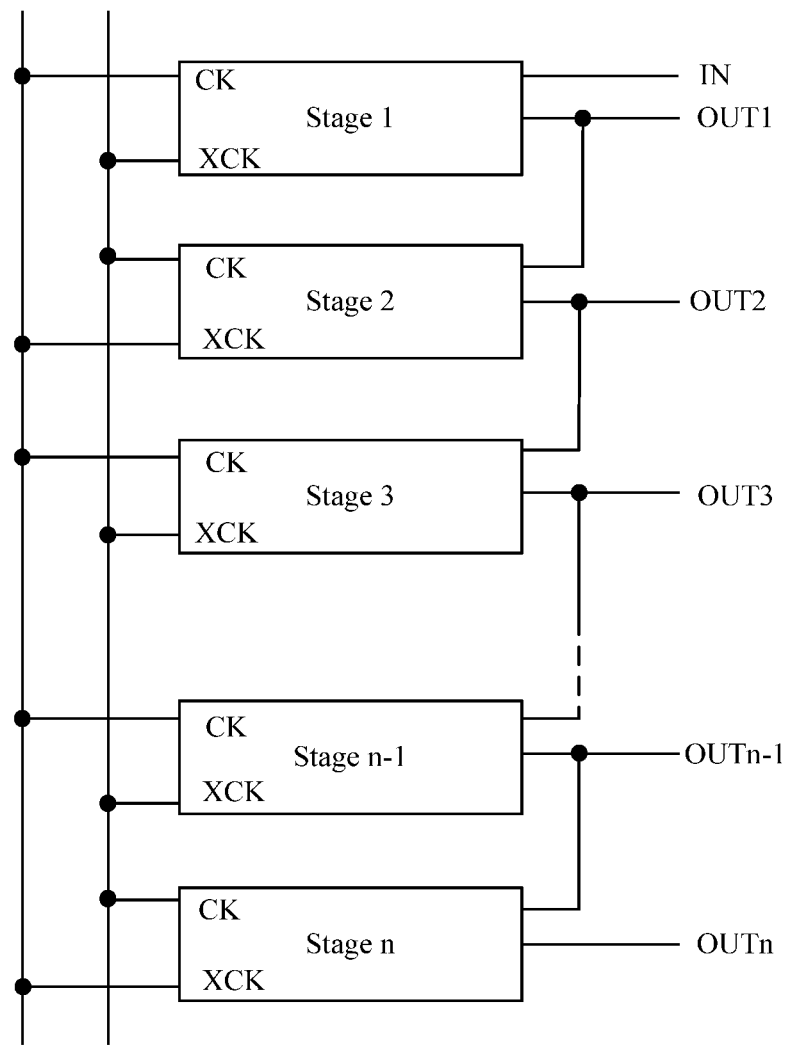
FIG. 11 is schematic structural diagram II of a first emission driving circuit according to an embodiment of the present disclosure.

As shown in FIG. 11, which is schematic structural diagram II of a first emission driving circuit according to an embodiment of the present disclosure, the first emission driving circuit 4 includes n stages of first shift registers cascaded with each other (illustrated as Stage 1-Stage n in FIG. 11). Output terminals of a first stage of first shift register to an $(x_1-1)^{th}$ stage of first shift register are electrically connected to a first row of pixel driving circuits 2 to an $(x_1-1)^{th}$ row of pixel driving circuits 2, respectively. Output terminals of an $(x_2+1)^{th}$ stage of first shift register to an $n^{th}$ stage of first shift register are electrically connected to an $(x_2+1)^{th}$ row of pixel driving circuits 2 to an $n^{th}$ row of pixel driving circuits 2, respectively. Output terminals of an $x_1^{th}$ stage of first shift register to an $x_2^{th}$ stage of first shift register are electrically connected to a first column to a $(y_1-1)^{th}$ column and a $(y_2+1)^{th}$ column to an $m^{th}$ column of an $x_1^{th}$ row of pixel driving circuits 2 to an $x_2^{th}$ row of pixel driving circuits 2, respectively. In this way, the output terminals of the first stage of first shift register to the $(x_1-1)^{th}$ stage of first shift register can sequentially output a first emission signal to the first row of pixel driving circuits 2 to the $(x_1-1)^{th}$ row of pixel driving circuits 2, the output terminals of the $x_1^{th}$ stage of first shift register to the $x_2^{th}$ stage of first shift register can sequentially output a first emission signal to the first column to the $(y_1-1)^{th}$ column and the $(y_2+1)^{th}$ column to the $m^{th}$ column of the $x_1^{th}$ row of pixel driving circuits 2 to the $x_2^{th}$ row of pixel driving circuits 2, and the output terminals of the $(x_2+1)^{th}$ stage of first shift register to the $n^{th}$ stage of first shift register can sequentially output a first emission signal to the $(x_2+1)^{th}$ row of pixel driving circuits 2 to the $n^{th}$ row of pixel driving circuits 2, to perform row-by-row control on light emission of the organic light-emitting components 2 within the display sub-area AA1.

The abovementioned "the output terminals of the first stage of first shift register to the $(x_1-1)^{th}$ stage of first shift register being electrically connected to the first row of pixel driving circuits 2 to the $(x_1-1)^{th}$ row of pixel driving circuits 2, the output terminals of the $(x_2+1)^{th}$ stage of first shift register to the $n^{th}$ stage of first shift register being electrically connected to the $(x_2+1)^{th}$ row of pixel driving circuits 2 to the $n^{th}$ row of pixel driving circuits 2, and the output terminals of the $x_1^{th}$ stage of first shift register to the $x_2^{th}$ stage of first shift register being electrically connected to the first column to the $(y_1-1)^{th}$ column and the $(y_2+1)^{th}$ column to the $m^{th}$ column of the $x_1^{th}$ row of pixel driving circuits 2 to the $x_2^{th}$ row of pixel driving circuits 2" may be achieved by the following manner. As shown in FIG. 10, the organic light-emitting display panel is provided with a plurality of first gate lines G1. Each row of the first row of pixel driving circuits 2 to the $(x_1-1)^{th}$ row of pixel driving circuits 2 is electrically connected to a respective one first gate line G1, each row of an $(x_2+1)^{th}$ row of pixel driving circuits 2 to the $n^{th}$ row of pixel driving circuits 2 is electrically connected to a respective one first gate line G1, each one of the first column to the $(y_1-1)^{th}$ column and the $(y_2+1)^{th}$ column to the $m^{th}$ column of the $x_1^{th}$ row of pixel driving circuits 2 to the $x_2^{th}$ row of pixel driving circuits 2 is electrically connected to a respective one first gate line G1, and the output terminals of the first stage of first shift register to the $n^{th}$ stage of first shift register are electrically connected to the first gate line G1 to the $n^{th}$ first gate line G1, respectively.

Figure 12:
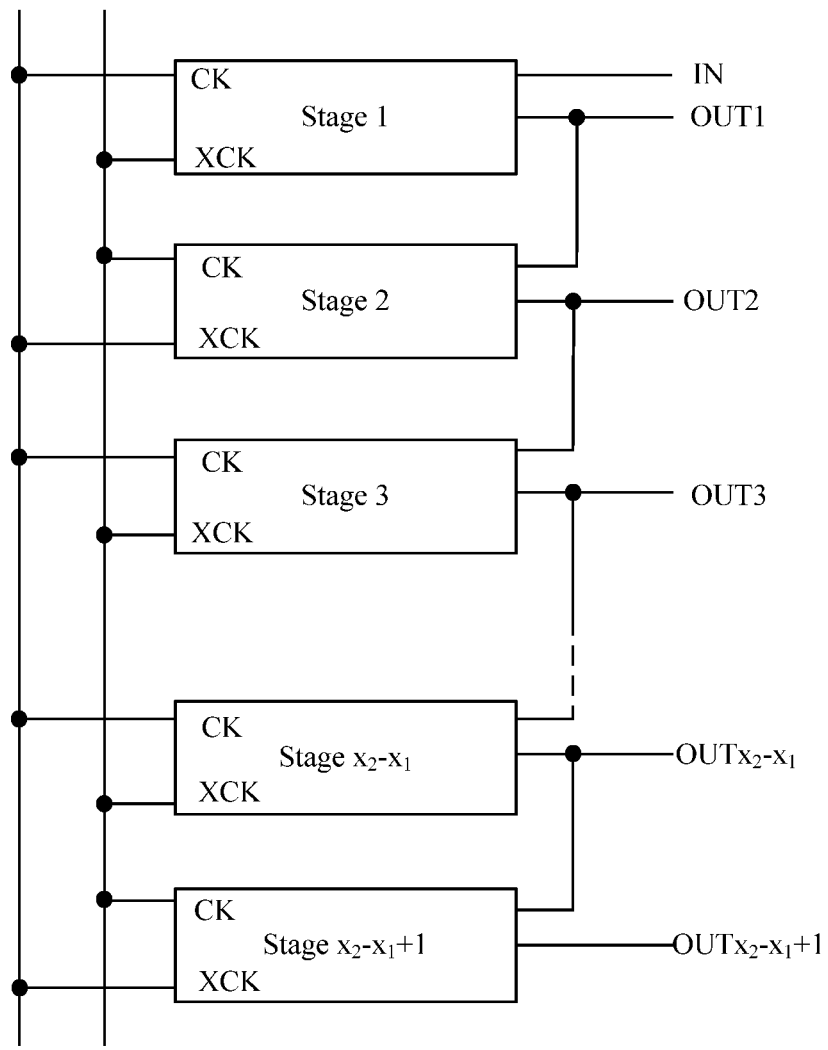
FIG. 12 is schematic structural diagram II of a second emission driving circuit according to an embodiment of the present disclosure.

As shown in FIG. 12, which is schematic structural diagram II of a second emission driving circuit according to an embodiment of the present disclosure, the second emission driving circuit 5 includes $(x_2-x_1+1)$ stages of second shift registers cascaded with each other, and output terminals of a first stage of second shift register to an $(x_2-x_1+1)^{th}$ stage of second shift register are electrically connected to a y column to a $y_2^{th}$ column of an $x_1^{th}$ row of pixel driving circuits 2 to an $x_2^{th}$ row of pixel driving circuits 2, respectively. In this way, the output terminals of the first stage of second shift register to the $(x_2-x_1+1)^{th}$ stage of second shift register can sequentially output a second emission signal to the $y_1^{th}$ column to the $y_2^{th}$ column of the $x_1^{th}$ row of pixel driving circuits 2 to the $x_2^{th}$ row of pixel driving circuits 2, to perform row-by-row control on light emission of the organic light-emitting components 2 within the fingerprint recognition sub-area AA2.

The abovementioned "the output terminals of the first stage of second shift register to the $(x_2-x_1+1)^{th}$ stage of second shift register being electrically connected to the $y_1^{th}$ column to the $y_2^{th}$ column of the $x_1^{th}$ row of pixel driving circuits 2 to the $x_2^{th}$ row of pixel driving circuits 2" may be achieved by the following manner. As shown in FIG. 10, the organic light-emitting display panel is provided with a plurality of second gate lines G2. Each one of the $y_1^{th}$ column to the $y_2^{th}$ column of the $x_1^{th}$ row of pixel driving circuits 2 to the $x_2^{th}$ row of pixel driving circuits 2 is electrically connected to a respective one second gate line G2. The output terminals of the first stage of second shift register to the $(x_2-x_1+1)^{th}$ stage of second shift register are connected the first second gate line G2 to the $(x_2-x_1+1)^{th}$ second gate line G2.

Refer to the first shift register for the circuit structure and operating sequence of the first shift register and the second shift register in this example, which will not be further described herein.

In this example, a start time of the input signal of the first stage of second shift register of the second emission driving circuit can be the same as a start time of the output signal of the $x_1^{th}$ stage of first shift register. Further, there can be a scanning time of only one row between the $x_1^{th}$ stage of first shift register driving the $x_1^{th}$ row of pixel driving circuits and the first stage of second shift register driving the $(x_1+1)^{th}$ row of pixel driving circuits, and there can be a same scanning time between any other stage of first (or second) shift register driving the corresponding row of pixel driving circuits and its adjacent stage of first (or second) shift register driving the corresponding row of pixel driving circuits. In this way, the organic light-emitting display panel can be row-by-row driven for achieving display. The configurations of the first emission driving circuit and the second emission driving circuit have no adverse affection on the display effect of the organic light-emitting display panel.

In this example, as shown in FIG. 10, the first emission driving circuit 4 is arranged along the column direction of the pixel driving circuits 2, and the second emission driving circuit 5 is located at a side of the first emission driving circuit 4 close to the display area AA or at a side of the first emission driving circuit 4 away from the display area AA (it is only taken as an example in FIG. 10 that the second emission driving circuit 5 is located at a side of the first emission driving circuit 4 close to the display area AA). In the row direction of the pixel driving circuits 2, the second emission driving circuit 5 corresponds to the fingerprint recognition sub-area AA2, so that the first emission driving circuit 4 can be easily connected to the pixel driving circuits 2 within the display sub-area AA1, and the second emission driving circuit 5 can be easily connected to the pixel driving circuits 2 within the fingerprint recognition sub-area AA2.

In an embodiment, as shown in FIG. 10, a scan driving circuit (not shown in FIG. 10) is arranged at a side of the first emission driving circuit 4 and the second emission driving circuit 5 close to the display area AA, so that in the row direction of the pixel driving circuits 2, the scan driving circuit can well correspond to all rows of pixel driving circuits, thereby simplifying connection between the scan driving circuit and the pixel driving circuits 2.

Figure 13:
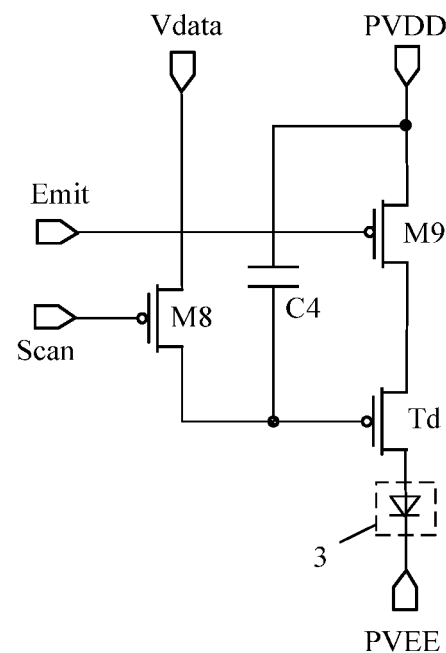
FIG. 13 is a schematic circuit diagram of a pixel driving circuit according to an embodiment of the present disclosure.

As shown in FIG. 13, which is a schematic circuit diagram of a pixel driving circuit according to an embodiment of the present disclosure, the pixel driving circuit 2 includes an eighth transistor M8, a ninth transistor M9, a driving transistor Td, and a fourth capacitor C4. The eighth transistor M8 has a control terminal electrically connected to a scan signal input terminal Scan, a first terminal electrically connected to a display signal input terminal Vdata, and a second terminal electrically connected to a control terminal of the driving transistor Td. The driving transistor Td has the control terminal electrically connected to the second terminal of the eighth transistor M8, a first terminal electrically connected to a second terminal of the ninth transistor M9, and a second terminal electrically connected to an anode of the organic light-emitting component 3. The ninth transistor M9 has a control terminal electrically connected to an emission signal input terminal Emit, a first terminal electrically connected to an anode signal input terminal PVDD, and the second terminal electrically connected to the first terminal of the driving transistor Td. The fourth capacitor C4 has a first terminal electrically connected to the control terminal of the driving transistor Td, and a second terminal electrically connected to the anode signal input terminal PVDD. The eighth transistor M8, the ninth transistor M9, and the driving transistor Td are all PMOS transistors.

In the display process (including the conventional display process and the fingerprint recognition process), when the driving transistor Td has a voltage difference between its control terminal and its first terminal smaller than its threshold voltage, the driving transistor Td is in an off state. When the voltage difference is greater than or equal to the threshold voltage, the driving transistor Td is in an on state. The greater the voltage difference is, the more completely the driving transistor Td can be turned on, the greater the current passing through the driving transistor Td is, and thus the greater the light emission current of the organic light-emitting component 3 is and the higher the brightness is.

Figure 14:
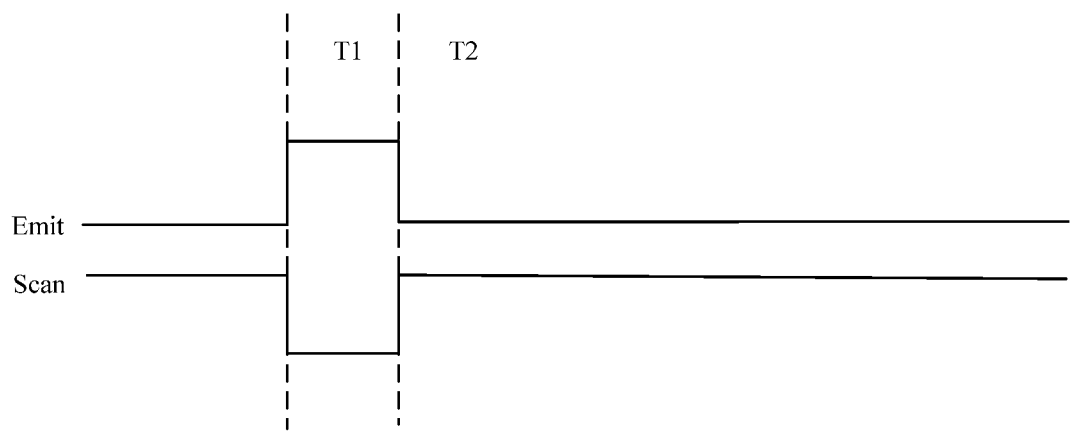
FIG. 14 is a sequence diagram of operations of a pixel driving circuit according to an embodiment of the present disclosure.

As shown in FIG. 14, which is a sequence diagram of operations of a pixel driving circuit according to an embodiment of the present disclosure, the process of driving the organic light-emitting components 3 by the pixel driving circuit 2 includes the following phases.

In a first phase T1, the scan signal provided at the scan signal input terminal Scan is at a low level, and the emission signal provided at the emission signal input terminal Emit is at a high level. The eighth transistor M8 is controlled by the scan signal to be turned on. The ninth transistor M9 is controlled by the emission signal to be turned off. A display signal provided by the display signal input terminal Vdata reaches the control terminal of the driving transistor Td through the eighth transistor M8, and the fourth capacitor C4 is charged. The driving transistor Td is turned on. The organic light-emitting component 3 does not emit light.

In a second phase T2, the scan signal provided at the scan signal input terminal Scan is at a high level, and the emission signal provided at the emission signal input terminal Emit is at a low level. The eighth transistor M8 is controlled by the scan signal to be turned off. The ninth transistor M9 is controlled by the emission signal to be turned on. The fourth capacitor C4 discharges to maintain the driving transistor Td to be turned on. The light emission current passes through the ninth transistor M9 and the driving transistor Td, and then flows through the organic light-emitting component 3 to drive the organic light-emitting component 3 to emit light.

Further, in an embodiment of the present disclosure, the plurality of organic light-emitting components 3 includes an organic light-emitting component 3 for emitting red light, an organic light-emitting component 3 for emitting green light, and an organic light-emitting component 3 for emitting blue light, so that the organic light-emitting display panel can achieve full-color display.

Further, it is has been found that in the organic light-emitting display panel, the organic light-emitting component 3 for emitting red light and the organic light-emitting component 3 for emitting green light have high light intensity, and the organic light-emitting component 3 for emitting blue light has low light intensity. Therefore, in an embodiment of the present disclosure, the fingerprint recognition sensor 7 is configured to receive red light emitted from organic light-emitting components and reflected by the fingerprint to perform fingerprint recognition, or is configured to receive green light emitted from organic light-emitting components and reflected by the fingerprint to perform fingerprint recognition, or is configured to receive white light formed by mixing light emitted from organic light-emitting components and reflected by the fingerprint to perform fingerprint recognition. In this way, on one hand, it is not necessary to additionally provide a light source to the fingerprint recognition sensor 7, which can simplify the structure of the organic light-emitting display panel, and on the other hand, the fingerprint recognition accuracy can be achieved.

In an embodiment, the organic light-emitting component 3 is an organic light-emitting diode, so that the organic light-emitting component 3 has excellent characteristics such as such as self-illumination, high brightness, wide viewing angle and fast response.

Figure 15:
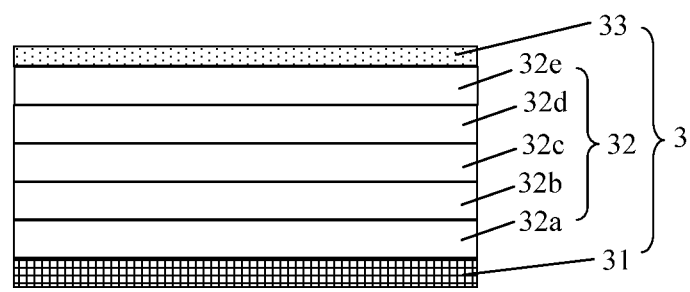
FIG. 15 is a schematic cross-sectional view of an organic light-emitting component according to an embodiment of the present disclosure.

Further, as shown in FIG. 15, which is a schematic cross-sectional view of an organic light-emitting component according to an embodiment of the present disclosure, the organic light-emitting component 3 includes an anode 31, an organic light-emitting function layer 32 and a cathode 33 that are sequentially stacked in a direction facing away from the base substrate 1. The organic light-emitting function layer 32 includes a hole injection layer 32a, a hole transmission layer 32b, a light-emitting layer 32c, an electron transmission layer 32d, and an electron injection layer 32e that are sequentially stacked in the direction facing away from the base substrate 1. In an example, cathodes 33 of all organic light-emitting diodes are in whole layer structure, so that the structure of the organic light-emitting display panel is simple and the driving is easy.

During the operating process of the organic light-emitting component 3, the cathode 33 generates electrons, and the anode 31 generates holes. Under the electric field between the cathode 33 and the anode 31, the holes pass through the hole injection layer 32a and the hole transmission layer 32b and then move toward the light-emitting layer 32c. The electrons pass through the electron injection layer 32e and the electron transmission layer 32d and move toward the light-emitting layer 32c. When the holes and electrons meet in the light-emitting layer 32c, the holes and the electrons can recombine to release energy, thereby causing the organic light-emitting component 3 to emit light.

Figure 16:
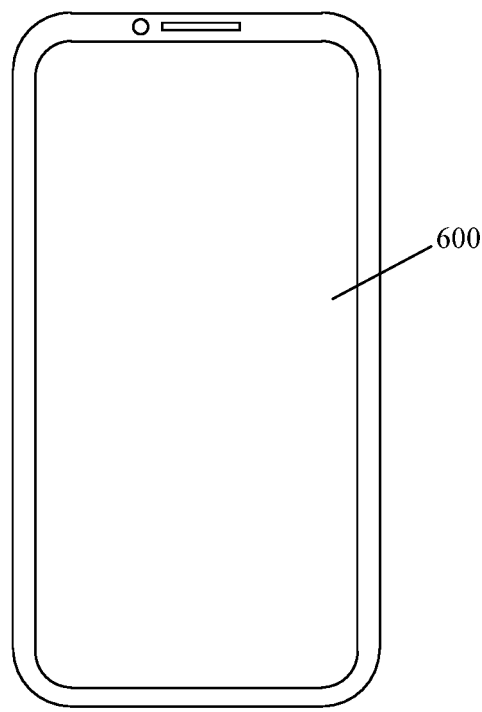
FIG. 16 is a schematic structural diagram of an organic light-emitting display device according to an embodiment of the present disclosure.

In addition, an embodiment of the present disclosure further provides an organic light-emitting display device, as shown in FIG. 16. FIG. 16 is a schematic structural diagram of an organic light-emitting display device according to an embodiment of the present disclosure. The organic light-emitting display device includes any of the organic light-emitting display panels 600 described above.

The organic light-emitting display device provided by the present disclosure can be any product or component with a display function, such as a smart phone, a wearable smart watch, smart glasses, a tablet computer, a television, a displayer, a notebook computer, a digital photo frame, a navigator, a car display, an e-book, etc. The display panel and the display device provided by the embodiments of the present disclosure can be flexible or non-flexible, which will not be limited by the present disclosure.

Figure 17:
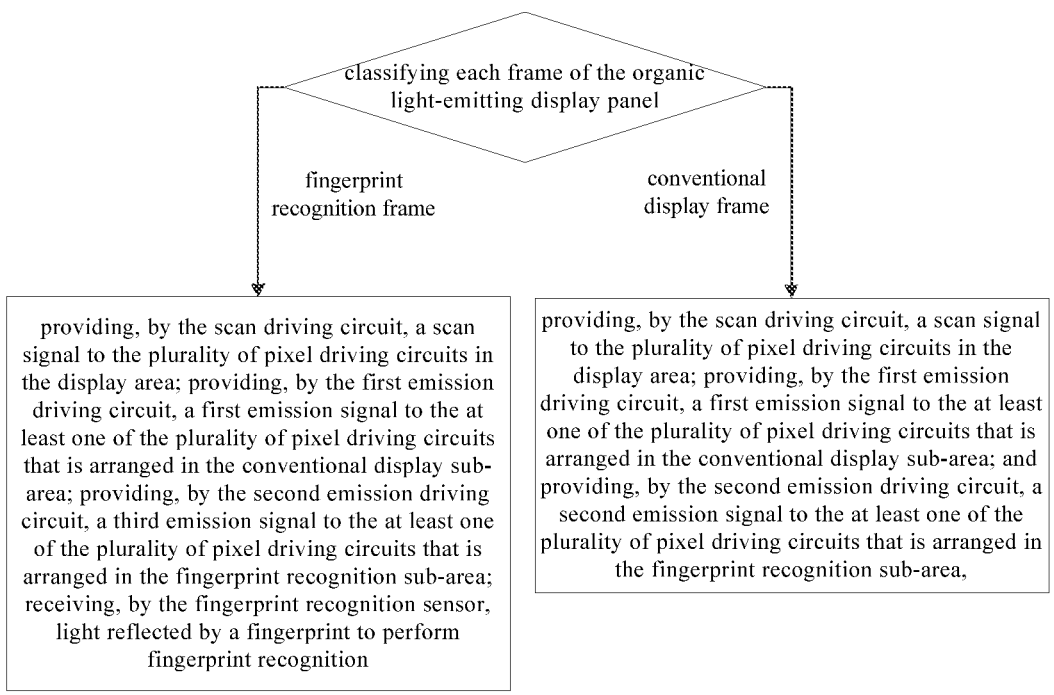
FIG. 17 is a flowchart of a method for driving an organic light-emitting display panel according to an embodiment of the present disclosure.

In addition, an embodiment of the present disclosure further provides a method for driving an organic light-emitting display panel, which is applicable to any one of the organic light-emitting display panels described above. As shown in FIG. 17, which is a flowchart of a method for driving an organic light-emitting display panel according to an embodiment of the present disclosure, each frame of the organic light-emitting display panel is a display frame or a fingerprint recognition frame, and the method for driving the organic light-emitting display panel includes the following steps.

In the display frame, the scan driving circuit 6 provides a scan signal to the pixel driving circuits 2 in the display area AA, the first emission driving circuit 4 provides a first emission signal to the pixel driving circuits 2 in the display sub-area AA1, and the second emission driving circuit 5 provides a second emission signal to the pixel driving circuits 2 in the fingerprint recognition sub-area AA2. A number of occurrences of high levels (i.e., enable levels) of the first emission signal is the same as a number of occurrences of high levels (i.e., enable levels) of the second emission signal, and each high level of the first emission signal has a same duration as that of a corresponding high level of the second emission signal.

In the fingerprint recognition frame, the scan driving circuit 6 provides a scan signal to the pixel driving circuits 2 in the display area AA, the first emission driving circuit 4 provides a first emission signal to the pixel driving circuits in the conventional display sub-area AA1, and the second emission driving circuit 5 provides a third emission signal to the pixel driving circuits 2 in the fingerprint recognition sub-area AA2. The fingerprint recognition sensor 7 receives light reflected by a fingerprint to perform fingerprint recognition. A number of occurrences of high levels of the third emission signal is smaller than the number of occurrences of high levels of the first emission signal, and/or each high level of the third emission signal has a shorter duration than that of a corresponding high level of the first emission signal.

The abovementioned fingerprint recognition process includes at least one fingerprint recognition frame, and the conventional display process includes at least one display frame.

In the display frame, a number of occurrences of high levels (i.e., the enable levels) of the first emission signal is the same as a number of occurrences of high levels (i.e., the enable levels) of the second emission signal, and each high level of the first emission signal has a same duration as that of a corresponding high level of the second emission signal. Therefore, the display sub-area AA1 and the fingerprint recognition sub-area AA2 have the same brightness, and thus the brightness of the organic light-emitting display panel is uniform and the display effect is good.

In the fingerprint recognition frame, a number of occurrences of high levels (i.e., the enable levels) of the third emission signal is smaller than the number of occurrences of high levels of the first emission signal, and/or each high level of the third emission signal has a shorter duration than that of a corresponding high level of the first emission signal. Therefore, the brightness of the display sub-area AA1 is the same as that of the display frame, and the brightness of the fingerprint recognition sub-area AA2 is higher than that of the display frame, so that the fingerprint recognition accuracy is good.

There are various configuration manners for the first emission signal, the second emission signal, and the third emission signal when satisfying the relationship between the first emission signal, the second emission signal, and the third emission signal. Examples will be described in the following embodiments.

In an example, in the display frame, the number of occurrences of high levels of the first emission signal and the number of occurrences of high levels of the second emission signal are both p1 (for example, p1=3), and each high level of the first emission signal and each high level of the second emission signal both have a duration of $T_1$. In the fingerprint recognition frame, the number of occurrences of high levels of the first emission signal is p1 and the number of occurrences of high levels of the third emission signal is p2 (for example, p2=1), and each high level of the first emission signal and each high level of the third emission signal both have a duration of $T_1$. Here, p1 and p2 are positive integers, and p1>p2.

In another example, in the display frame, the number of occurrences of high levels of the first emission signal and the number of occurrences of high levels of the second emission signal are both q (for example, q=1), and each high level of the first emission signal and each high level of the second emission signal both have a duration of $T_2$. In the fingerprint recognition frame, the number of occurrences of high levels of the first emission signal is q and each high level of the first emission signal has a duration of $T_2$, and the number of occurrences of high levels of the third emission signal is q and each high level of the third emission signal has a duration of $T_3$, where $T_3<T_2$. Here, q is a positive integer. Optionally, $T_3=T_2/3$.

In addition, there may be one or more scan signals provided by the scan driving circuit 6 (for example two). For better driving the pixel driving circuit 2 and further driving the organic light-emitting component 3 to emit light, in an embodiment of the present disclosure, each of the duration of each high level of the first emission signal, the duration of each high level of the second emission signal and the duration of each high level of the third emission signal is longer than or equal to a sum of durations of low levels of the scan signal provided by the scan driving circuit 6. In this way, there is enough time to write a signal on the control terminal of the connected driving transistor before the organic light-emitting component 3 emits light, so that the organic light-emitting component 3 has a better light emission effect. For example, each of the duration of each high level of the first emission signal, the duration of each high level of the second emission signal and the duration of each high level of the third emission signal has two phases, the scan driving circuit 6 provides two scan signals, and the durations of the low levels of the two scan signals each has one phase.

In an embodiment, the organic light-emitting components 3 include an organic light-emitting component 3 for emitting red light, an organic light-emitting component 3 for emitting green light, and an organic light-emitting component 3 for emitting blue light, so that the organic light-emitting display panel can achieve full-color display.

Further, in an embodiment, in the fingerprint recognition frame, the fingerprint recognition sensor 7 receives red light reflected by a fingerprint to perform fingerprint recognition, or the fingerprint recognition sensor 7 receives green light reflected by the fingerprint to perform fingerprint recognition, or the fingerprint recognition sensor 7 receives white light reflected by the fingerprint to perform fingerprint recognition. In this way, on one hand, it is not necessary to additionally provide a light source to the fingerprint recognition sensor 7, which can simplify the structure of the organic light-emitting display panel, and on the other hand, the fingerprint recognition accuracy can be achieved.

In an embodiment, as shown in FIG. 1, FIG. 6 and FIG. 9, the plurality of pixel driving circuits 2 is distributed in n rows and m columns, the display sub-area AA1 and the fingerprint recognition sub-area AA2 are arranged along a column direction of the plurality of pixel driving circuits 2, x rows of pixel driving circuits 2 are arranged in the display sub-area, and (n−x) rows of pixel driving circuits 2 are arranged in the fingerprint recognition sub-area AA2, where n and m are positive integers greater than 1 and x is a positive integer greater than or equal to 1 and smaller than n. The first emission driving circuit 4 includes x stages of first shift registers cascaded with each other, and output terminals of a first stage of first shift register to an $x^{th}$ stage of first shift register are electrically connected to a first row of pixel driving circuits 2 to an $x^{th}$ row of pixel driving circuits 2. The second emission driving circuit 5 includes (n−x) stages of second shift registers cascaded with each other, and output terminals of a first stage of second shift register to an $(n-x)^{th}$ stage of second shift register are electrically connected to an $(x+1)^{th}$ row of pixel driving circuits 2 to an $n^{th}$ row of pixel driving circuits 2.

Based on this, in an embodiment, in the display frame, a signal inputted to the first stage of second shift register is the same as the first emission signal emitted from the $x^{th}$ stage of first shift register, so that the brightness of the fingerprint recognition sub-area AA2 is the same as the brightness of the display sub-area AA1. In the fingerprint recognition frame, a high level of the signal inputted to the first stage of second shift register has a same start time as that of a high level of the first emission signal emitted from the $x^{th}$ stage of first shift register, and the high level of the signal inputted to the first stage of second shift register has a shorter duration than that of the high level of the first emission signal emitted from the $x^{th}$ stage of first shift register, so that the brightness of the fingerprint recognition sub-area AA2 is higher than the brightness of the display sub-area AA1.

In an embodiment, as shown in FIG. 10, FIG. 11 and FIG. 12, the plurality of pixel driving circuits 2 is distributed in n rows and m columns, the display sub-area AA1 surrounds at least a portion of the fingerprint recognition sub-area AA2; and pixel driving circuits 2 in a $y_1^{th}$ column to a $y_2^{th}$ column of an $x_1^{th}$ row to an $x_2^{th}$ row are located within the fingerprint recognition sub-area AA2, where $x_1$, $x_2$, $y_1$, and $y_2$ are all positive integers, $1 \le x_1 < n$, $x_1 < x_2 \le n$, $1 \le y_1 < m$, $y_1 < y_2 \le m$, where n and m are positive integers greater than 1. The first emission driving circuit 4 includes n stages of first shift registers cascaded with each other, and output terminals of a first stage of first shift register to an $(x_1-1)^{th}$ stage of first shift register are electrically connected to a first row of pixel driving circuits 2 to an $(x_1-1)^{th}$ row of pixel driving circuits 2, respectively; output terminals of an $(x_2+1)^{th}$ stage of first shift register to an $n^{th}$ stage of first shift register are electrically connected to an $(x_2+1)^{th}$ row of pixel driving circuits 2 to an $n^{th}$ row of pixel driving circuits 2, respectively; and output terminals of an $x_1^{th}$ stage of first shift register to an $x_2^{th}$ stage of first shift register are electrically connected to a first column to a $(y_1-1)^{th}$ column and a $(y_2+1)^{th}$ column to an $m^{th}$ column of an $x_1^{th}$ row of pixel driving circuits 2 to an $x_2^{th}$ row of pixel driving circuits 2, respectively. The second emission driving circuit 5 includes $(x_2-x_1+1)$ stages of second shift registers cascaded with each other, and output terminals of a first stage of second shift register to an $(x_2-x_1+1)^{th}$ stage of second shift register are electrically connected to a $y_1^{th}$ column to a $y_2^{th}$ column of an $x_1^{th}$ row of pixel driving circuits 2 to an $x_2^{th}$ row of pixel driving circuits 2, respectively.

Based on this, in an embodiment, in the display frame, a signal inputted to the first stage of second shift register is the same as the first emission signal emitted from the $(x-1)^{th}$ stage of first shift register, so that the brightness of the fingerprint recognition sub-area AA2 is the same as the brightness of the display sub-area AA1. In the fingerprint recognition frame, a high level of the signal inputted to the first stage of second shift register has a same start time as that of a high level of the first emission signal emitted from the $(x_1-1)^{th}$ stage of first shift register, and the high level of the signal inputted to the first stage of second shift register has a shorter duration than that of the high level of the first emission signal emitted from the $(x_1-1)^{th}$ stage of first shift register, so that the brightness of the fingerprint recognition sub-area AA2 is higher than the brightness of the display sub-area AA1. For the related principle, reference can be made to descriptions with respect to FIG. 4 and FIG. 5, which will not be further described herein.

It should be noted that the related contents about the organic light-emitting display panel in the embodiments of the present disclosure are all applicable to the driving method thereof. Similarly, the related contents about the method for driving the organic light-emitting display panel are also all applicable to the organic light-emitting display panel, which will not be further described herein.

The present disclosure provides an organic light-emitting display panel, a method for driving the display panel, and an organic light-emitting display device. The organic light-emitting display panel includes a first emission driving circuit 4 and a second emission driving circuit 5. The first emission driving circuit 4 is arranged in the peripheral area NA and electrically connected to pixel driving circuits 2 in the display sub-area AA1. The second emission driving circuit 5 is arranged in the peripheral area NA and electrically connected to pixel driving circuits 2 in the fingerprint recognition sub-area AA2. The brightness of the organic light-emitting component 3 within the display sub-area AA1 is controlled by the first emission driving circuit 4, and the brightness of the organic light-emitting component 3 within the fingerprint recognition sub-area AA2 is controlled by the second emission driving circuit 5. In this way, the brightness of the display sub-area AA1 and the brightness of the fingerprint recognition sub-area AA2 of the organic light-emitting display panel can be independently controlled. When switching from the conventional display process to the fingerprint recognition process, only the second emission driving circuit 5 can be used to control the brightness of the organic light-emitting component 3 within the fingerprint recognition sub-area AA2 to increase, and the brightness of the organic light-emitting component 3 within the display sub-area AA1 can remain unchanged. In this way, the brightness of the overall organic light-emitting display panel will not change abruptly, thereby achieving the good display effect of the organic light-emitting display panel.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:
1. An organic light-emitting display panel, comprising:
  a base substrate, wherein a display area and a peripheral area surrounding the display area are provided on the base substrate, and the display area comprises a display sub-area and a fingerprint recognition sub-area;
  a plurality of pixel driving circuits and a plurality of organic light-emitting components, wherein the plurality of pixel driving circuits and the plurality of organic light-emitting components are arranged in the display area, and the plurality of organic light-emitting components is electrically connected to the plurality of pixel driving circuits in one-to-one correspondence;
  a first emission driving circuit arranged in the peripheral area and electrically connected to at least one of the plurality of pixel driving circuits that is arranged in the display sub-area;
  a second emission driving circuit arranged in the peripheral area and electrically connected to at least one of the plurality of pixel driving circuits that is arranged in the fingerprint recognition sub-area;
  a scan driving circuit arranged in the peripheral area and electrically connected to the plurality of pixel driving circuits in the display area; and
  a fingerprint recognition sensor arranged at a side of the plurality of organic light-emitting components facing toward the base substrate, wherein an orthographic projection of the fingerprint recognition sensor on a plane of the base substrate is located within the fingerprint recognition sub-area;
  wherein the plurality of pixel driving circuits is distributed in n rows and m columns, the display sub-area and the fingerprint recognition sub-area are sequentially arranged along a column direction of the plurality of pixel driving circuits, and x rows of pixel driving circuits are arranged in the display sub-area, and (n−x) rows of pixel driving circuits are arranged in the fingerprint recognition sub-area, where n and m are positive integers greater than 1, and x is a positive integer greater than or equal to 1 and less than n;
  wherein the first emission driving circuit comprises x stages of first shift registers cascaded with each other, and output terminals of a first stage of first shift register to an $x^{th}$ stage of first shift register are electrically connected to a first row of pixel driving circuits to an $x^{th}$ row of pixel driving circuits;
  wherein the second emission driving circuit comprises (n−x) stages of second shift registers cascaded with each other, and output terminals of a first stage of second shift register to an $(n-x)^{th}$ stage of second shift register are electrically connected to an $(x+1)^{th}$ row of pixel driving circuits to an $n^{th}$ row of pixel driving circuits;
  wherein each frame of the organic light-emitting display panel is a display frame or a fingerprint recognition frame; in the display frame, a signal inputted to the first stage of second shift register is the same as the first emission signal emitted from the $x^{th}$ stage of first shift register; and in the fingerprint recognition frame, a high level of the signal inputted to the first stage of second shift register starts at a same time as a high level of the first emission signal emitted from the $x^{th}$ stage of first shift register, and the high level of the signal inputted to the first stage of second shift register has a shorter duration than the high level of the first emission signal emitted from the $x^{th}$ stage of first shift register.

2. The organic light-emitting display panel according to claim 1, wherein the first emission driving circuit and the second emission driving circuit are sequentially arranged along the column direction of the plurality of pixel driving circuits; and in a row direction of the plurality of pixel driving circuits, the first emission driving circuit corresponds to the display sub-area, and the second emission driving circuit corresponds to the fingerprint recognition sub-area.

3. The organic light-emitting display panel according to claim 2, wherein the scan driving circuit is arranged at a side of the first emission driving circuit and the second emission driving circuit facing toward the display area.

4. The organic light-emitting display panel according to claim 1, wherein the plurality of organic light-emitting components comprises an organic light-emitting component for emitting red light, an organic light-emitting component for emitting green light, and an organic light-emitting component for emitting blue light.

5. The organic light-emitting display panel according to claim 4, wherein the fingerprint recognition sensor is configured to receive red light that is emitted from the plurality of organic light-emitting components and reflected by a fingerprint, to perform fingerprint recognition, or is configured to receive green light that is emitted from the plurality of organic light-emitting components and reflected by the fingerprint, to perform fingerprint recognition, or is configured to receive white light that is formed by mixing light emitted from the plurality of organic light-emitting components and reflected by the fingerprint, to perform fingerprint recognition.

6. A method for driving an organic light-emitting display panel, applicable to an organic light-emitting display panel, wherein the organic light-emitting display panel comprises:
a base substrate, wherein a display area and a peripheral area surrounding the display area are provided on the base substrate, and the display area comprises a display sub-area and a fingerprint recognition sub-area;
a plurality of pixel driving circuits and a plurality of organic light-emitting components, wherein the plurality of pixel driving circuits and the plurality of organic light-emitting components are arranged in the display area, and the plurality of organic light-emitting components is electrically connected to the plurality of pixel driving circuits in one-to-one correspondence;
a first emission driving circuit arranged in the peripheral area and electrically connected to at least one of the plurality of pixel driving circuits that is arranged in the display sub-area;
a second emission driving circuit arranged in the peripheral area and electrically connected to at least one of the plurality of pixel driving circuits that is arranged in the fingerprint recognition sub-area;
a scan driving circuit arranged in the peripheral area and electrically connected to the plurality of pixel driving circuits in the display area; and
a fingerprint recognition sensor arranged at a side of the plurality of organic light-emitting components facing toward the base substrate, wherein an orthographic projection of the fingerprint recognition sensor on a plane of the base substrate is located within the fingerprint recognition sub-area,
wherein each frame of the organic light-emitting display panel is a display frame or a fingerprint recognition frame, and the method comprises steps of:
in the display frame, providing, by the scan driving circuit, a scan signal to the plurality of pixel driving circuits in the display area; providing, by the first emission driving circuit, a first emission signal to the at least one of the plurality of pixel driving circuits that is arranged in the display sub-area; and providing, by the second emission driving circuit, a second emission signal to the at least one of the plurality of pixel driving circuits that is arranged in the fingerprint recognition sub-area, wherein a number of occurrences of high levels of the first emission signal is the same as a number of occurrences of high levels of the second emission signal, and each high level of the first emission signal has a same duration as that of a corresponding high level of the second emission signal; and
in the fingerprint recognition frame, providing, by the scan driving circuit, a scan signal to the plurality of pixel driving circuits in the display area; providing, by the first emission driving circuit, a first emission signal to the at least one of the plurality of pixel driving circuits that is arranged in the display sub-area; providing, by the second emission driving circuit, a third emission signal to the at least one of the plurality of pixel driving circuits that is arranged in the fingerprint recognition sub-area; receiving, by the fingerprint recognition sensor, light reflected by a fingerprint to perform fingerprint recognition, wherein a number of occurrences of high levels of the third emission signal is smaller than the number of occurrences of high levels of the first emission signal, and/or each high level of the third emission signal has a shorter duration than that of a corresponding high level of the first emission signal,
wherein the plurality of pixel driving circuits is distributed in n rows and m columns,
wherein the display sub-area and the fingerprint recognition sub-area are sequentially arranged along a column direction of the plurality of pixel driving circuits, x rows of pixel driving circuits are arranged in the display sub-area, and (n−x) rows of pixel driving circuits are arranged in the fingerprint recognition sub-area, where n and m are positive integers greater than 1 and x is a positive integer greater than or equal to 1 and less than n; the first emission driving circuit comprises x stages of first shift registers cascaded with each other, and output terminals of a first stage of first shift register to an $x^{th}$ stage of first shift register are electrically connected to a first row of pixel driving circuits to an $x^{th}$ row of pixel driving circuits; the second emission driving circuit comprises (n−x) stages of second shift registers cascaded with each other, and output terminals of a first stage of second shift register to an $(n-x)^{th}$ stage of second shift register are electrically connected to an $(x+1)^{th}$ row of pixel driving circuits to an $n^{th}$ row of pixel driving circuits; wherein in the display frame, a signal inputted to the first stage of second shift register is the same as the first emission signal emitted from the $x^{th}$ stage of first shift register; and wherein in the fingerprint recognition frame, a high level of the signal inputted to the first stage of second shift register starts at a same time as a high level of the first emission signal emitted from the $x^{th}$ stage of first shift register, and the high level of the signal inputted to the first stage of second shift register has a shorter duration than the high level of the first emission signal emitted from the $x^{th}$ stage of first shift register; or
wherein the display sub-area surrounds at least a portion of the fingerprint recognition sub-area; and pixel driving circuits in a $y_1^{th}$ column to a $y_2^{th}$ column of an $x_1^{th}$ row to an $x_2^{th}$ row are located within the fingerprint recognition sub-area, where $x_1$, $x_2$, $y_1$, and $y_2$ are all positive integers, $1 \leq x_1 < n$, $x_1 < x_2 \leq n$, $1 \leq y_1 < m$, $y_1 < y_2 \leq m$, where n and m are positive integers greater than 1; the first emission driving circuit comprises n stages of first shift registers cascaded with each other, and output terminals of a first stage of first shift register to an $(x_1-1)^{th}$ stage of first shift register are electrically connected to a first row of pixel driving circuits to an $(x_1-1)^{th}$ row of pixel driving circuits, respectively; output terminals of an $(x_2+1)^{th}$ stage of first shift register to an $n^{th}$ stage of first shift register are electrically connected to an $(x_2+1)^{th}$ row of pixel driving circuits to an $n^{th}$ row of pixel driving circuits, respectively; and output terminals of an $x_1^{th}$ stage of first shift register to an $x_2^{th}$ stage of first shift register are electrically connected to a first column to a $(y_1-1)^{th}$ column and a $(y_2+1)^{th}$ column to an $m^{th}$ column of an $x_1^{th}$ row of pixel driving circuits to an $x_2^{th}$ row of pixel driving circuits, respectively; the second emission driving circuit comprises $(x_2-x_1+1)$ stages of second shift registers cascaded with each other, and output terminals of a first stage of second shift register to an $(x_2-x_1+1)^{th}$ stage of second shift register are electrically connected to a $y_1^{th}$ column to a $y_2^{th}$ column of an $x_1^{th}$ row of pixel driving circuits to an $x_2^{th}$ row of pixel driving circuits, respectively; wherein in the display frame, a signal inputted to the first stage of second shift register is the same as the first emission signal emitted from the $(x_1-1)^{th}$ stage of first shift register; and wherein in the fingerprint recognition frame, a high level of the signal inputted to the first stage of second shift register starts at a same time as a high level of the first emission signal emitted from the $(x_1-1)^{th}$ stage of first shift register, and the high level of the signal inputted to the first stage of second shift register has a shorter duration than the high level of the first emission signal emitted from the $(x_1-1)^{th}$ stage of first shift register.

7. The method according to claim 6, wherein in the display frame, the number of occurrences of high levels of the first emission signal and the number of occurrences of high levels of the second emission signal are both p1, and each high level of the first emission signal and each high level of the second emission signal both have a duration of $T_1$;

wherein in the fingerprint recognition frame, the number of occurrences of high levels of the first emission signal is p1 and the number of occurrences of high levels of the third emission signal is p2, and each high level of the first emission signal and each high level of the third emission signal both have a duration of $T_1$; and wherein p1 and p2 are positive integers, and p1>p2.

8. The method according to claim 6, wherein in the display frame, the number of occurrences of high levels of the first emission signal and the number of occurrences of high levels of the second emission signal are both q, and each high level of the first emission signal and each high level of the second emission signal both have a duration of $T_2$;

wherein in the fingerprint recognition frame, the number of occurrences of high levels of the first emission signal and the number of occurrences of high levels of the third emission signal are both q, each high level of the first emission signal has a duration of $T_2$, and each high level of the third emission signal has a duration of $T_3$, where $T_3 \leq T_2$; and wherein q is a positive integer.

9. The method according to claim 8, wherein $T_3=T_2/3$.

10. The method according to claim 6, wherein the duration of each high level of the first emission signal, the duration of each high level of the second emission signal and the duration of each high level of the third emission signal each is longer than or equal to a sum of durations of low levels of the scan signal provided by the scan driving circuit.

11. The method according to claim 6, wherein the plurality of organic light-emitting components comprises an organic light-emitting component for emitting red light, an organic light-emitting component for emitting green light, and an organic light-emitting component for emitting blue light; and wherein in the fingerprint recognition frame, the fingerprint recognition sensor receives red light reflected by a fingerprint to perform fingerprint recognition, or the fingerprint recognition sensor receives green light reflected by the fingerprint to perform fingerprint recognition, or the fingerprint recognition sensor receives white light reflected by the fingerprint to perform fingerprint recognition.

12. An organic light-emitting display panel, comprising:
a base substrate, wherein a display area and a peripheral area surrounding the display area are provided on the base substrate, and the display area comprises a display sub-area and a fingerprint recognition sub-area;
a plurality of pixel driving circuits and a plurality of organic light-emitting components, wherein the plurality of pixel driving circuits and the plurality of organic light-emitting components are arranged in the display area, and the plurality of organic light-emitting components is electrically connected to the plurality of pixel driving circuits in one-to-one correspondence;
a first emission driving circuit arranged in the peripheral area and electrically connected to at least one of the plurality of pixel driving circuits that is arranged in the display sub-area;
a second emission driving circuit arranged in the peripheral area and electrically connected to at least one of the plurality of pixel driving circuits that is arranged in the fingerprint recognition sub-area;
a scan driving circuit arranged in the peripheral area and electrically connected to the plurality of pixel driving circuits in the display area; and
a fingerprint recognition sensor arranged at a side of the plurality of organic light-emitting components facing toward the base substrate, wherein an orthographic projection of the fingerprint recognition sensor on a plane of the base substrate is located within the fingerprint recognition sub-area,
wherein the plurality of pixel driving circuits is distributed in n rows and m columns, the display sub-area surrounds at least a portion of the fingerprint recognition sub-area, and pixel driving circuits in a $y_1^{th}$ column to a $y_2^{th}$ column of an $x_1^{th}$ row to an $x_2^{th}$ row are located within the fingerprint recognition sub-area, where $x_1$, $x_2$, $y_1$, and $y_2$ are all positive integers, $1 \leq x_1 < n$, $x_1 < x_2 \leq n$, $1 \leq y_1 < m$, and $y_1 < y_2 \leq m$, where n and m are both positive integers greater than 1;
wherein the first emission driving circuit comprises n stages of first shift registers cascaded with each other, and output terminals of a first stage of first shift register to an $(x_1-1)^{th}$ stage of first shift register are electrically connected to a first row of pixel driving circuits to an $(x_1-1)^{th}$ row of pixel driving circuits; output terminals of an $(x_2+1)^{th}$ stage of first shift register to an $n^{th}$ stage of first shift register are electrically connected to an $(x_2+1)^{th}$ row of pixel driving circuits to an $n^{th}$ row of pixel driving circuits; and output terminals of an $x_1^{th}$ stage of first shift register to an $x_2^{th}$ stage of first shift register are electrically connected to a first column to a $(y_1-1)^{th}$ column and a $(y_2+1)^{th}$ column to an $m^{th}$ column of an $x_1^{th}$ row of pixel driving circuits to an $x_2^{th}$ row of pixel driving circuits; and
wherein the second emission driving circuit comprises $(x_2-x_1+1)$ stages of second shift registers cascaded with each other, and output terminals of a first stage of second shift register to an $(x_2-x_1+1)^{th}$ stage of second shift register are electrically connected to a $y_1^{th}$ column to a $y_2^{th}$ column of an $x_1^{th}$ row of pixel driving circuits to an $x_2^{th}$ row of pixel driving circuits, respectively; and
wherein each frame of the organic light-emitting display panel is a display frame or a fingerprint recognition frame; in the display frame, a signal inputted to the first stage of second shift register is the same as the first emission signal emitted from the $(x_1-1)^{th}$ stage of first shift register; and in the fingerprint recognition frame, a high level of the signal inputted to the first stage of second shift register starts at a same time as a high level of the first emission signal emitted from the $(x_1-1)^{th}$ stage of first shift register, and the high level of the signal inputted to the first stage of second shift register has a shorter duration than the high level of the first emission signal emitted from the $(x_1-1)^{th}$ stage of first shift register.

13. The organic light-emitting display panel according to claim 12, wherein the first emission driving circuit and the second emission driving circuit are sequentially arranged along the column direction of the plurality of pixel driving circuits; and in a row direction of the plurality of pixel driving circuits, the first emission driving circuit corresponds to the display sub-area, and the second emission driving circuit corresponds to the fingerprint recognition sub-area.

14. The organic light-emitting display panel according to claim 13, wherein the scan driving circuit is arranged at a side of the first emission driving circuit and the second emission driving circuit facing toward the display area.

15. The organic light-emitting display panel according to claim 12, wherein the first emission driving circuit is arranged along a column direction of the plurality of pixel driving circuits, and the second emission driving circuit is arranged at a side of the first emission driving circuit facing toward the display area or at a side of the first emission driving circuit facing away from the display area; and in a row direction of the plurality of pixel driving circuits, the second emission driving circuit corresponds to the fingerprint recognition sub-area.

16. The organic light-emitting display panel according to claim 15, wherein the scan driving circuit is arranged at a side of the first emission driving circuit and the second emission driving circuit facing toward the display area.

17. The organic light-emitting display panel according to claim 12, wherein the plurality of organic light-emitting components comprises an organic light-emitting component for emitting red light, an organic light-emitting component for emitting green light, and an organic light-emitting component for emitting blue light.

18. The organic light-emitting display panel according to claim 17, wherein the fingerprint recognition sensor is configured to receive red light that is emitted from the plurality of organic light-emitting components and reflected by a fingerprint, to perform fingerprint recognition, or is configured to receive green light that is emitted from the plurality of organic light-emitting components and reflected by the fingerprint, to perform fingerprint recognition, or is configured to receive white light that is formed by mixing light emitted from the plurality of organic light-emitting components and reflected by the fingerprint, to perform fingerprint recognition.

* * * * *